US008126213B2

(12) United States Patent
Chao et al.

(10) Patent No.: US 8,126,213 B2
(45) Date of Patent: Feb. 28, 2012

(54) METHOD AND SYSTEM FOR WHOLESOMENESS INSPECTION OF FRESHLY SLAUGHTERED CHICKENS ON A PROCESSING LINE

(75) Inventors: Kuanglin Chao, Ellicott City, MD (US); Yud R. Chen, Laurel, MD (US); Moon S. Kim, Silver Spring, MD (US); Diane Chan, Odenton, MD (US); Chun-Chieh Yang, Greenbelt, MD (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 1125 days.

(21) Appl. No.: 11/904,537

(22) Filed: Sep. 27, 2007

(65) Prior Publication Data
US 2009/0087033 A1 Apr. 2, 2009

(51) Int. Cl.
G06K 9/00 (2006.01)
(52) U.S. Cl. ...................................................... 382/110
(58) Field of Classification Search .................... 382/110
See application file for complete search history.

(56) References Cited

U.S. PATENT DOCUMENTS

| | | | | |
|---|---|---|---|---|
| 6,587,575 | B1 * | 7/2003 | Windham et al. | 382/110 |
| 7,313,270 | B2 * | 12/2007 | Sones | 382/159 |
| 7,787,111 | B2 * | 8/2010 | Kim et al. | 356/73 |
| 7,835,002 | B2 * | 11/2010 | Muhammed et al. | 356/419 |
| 2004/0136569 | A1 * | 7/2004 | Daley et al. | 382/110 |
| 2010/0144053 | A1 * | 6/2010 | Haushalter et al. | 436/164 |

OTHER PUBLICATIONS

"Development of Fast Line Scanning Imaging Algorithm for Diseased Chicken Detection," Chun-Chieh Yang, et al, Optical Sensors and Sensing Systems for Natural Resources and Food Safety and Quality, Boston, MA, USA, Oct. 23, 2005; Proceedings of the SPIE—The International Society for Optical Engineering, Nov. 9, 2005, vol. 5996, pp. 59960C-1-59960C-12.*
"Machine vision technology for agricultural applications," Yud-Ren Chen, et al., Computers and Electronics in Agriculture 36 (2002) 173-191.*
Chao, K., et al., "Fast Line-Scan Imaging System for Broiler Carcass Inspection", *Sens. & Instrumen. Food Qual.*, vol. 1, 2007, pp. 62-71.
Chao, K., et al., "Poultry Carcass Inspection by a Fast Line-Scan Imaging System: Results from In-Plant Testing", Proc. of SPIE, vol. 6381, (63810V), 2006, pp. 1-11.
Chao, K., et al., "Use of Hyper- and Multi-Spectral Imaging for Detection of Chicken Skin Tumors", Applied Engineering and Agriculture, vol. 18 (1), 2002, pp. 113-119.
Chao, K., et al., "On-line Inspection of Poultry Carcasses by a Dual-Camera System", *J. of Food Engineering*, vol. 51, 2002, pp. 185-192.
Chao, K., et al., "Color Image Classification Systems for Poultry Viscera Inspection", *Applied Engineering in Agriculture*, vol. 15, (4), 1999, pp. 363-369.

(Continued)

*Primary Examiner* — Wengpeng Chen
(74) *Attorney, Agent, or Firm* — John D. Fado; Robert D. Jones

(57) ABSTRACT

An imaging system containing an electron-multiplying charge-coupled device detector and line-scan spectrograph is used for identifying wholesome and unwholesome freshly slaughtered chicken carcasses on high-speed commercial chicken processing lines. Multispectral imaging algorithms allow for real-time online identification of wholesome and unwholesome chicken carcasses.

19 Claims, 20 Drawing Sheets
(3 of 20 Drawing Sheet(s) Filed in Color)

OTHER PUBLICATIONS

Chao, K., et al., "Analysis of Vis-NIR Spectral Variations of Wholesome, Septicemia, and Cadaver Chicken Samples", *Applied Engineering in Agriculture*, vol. 19, (4), 2003, pp. 453-458.

Chao, K., et al., "A Spectroscopic System for High-Speed Inspection of Poultry Carcasses", *Applied Engineering in Agriculture*, vol. 20, (5), 2004, pp. 683-690.

Chen, Z., et al., "Multiresolution Local Contrast Enhancement of X-Ray images for Poultry Meat Inspection", *Applied Optics*, vol. 40, (8), 2001, pp. 1195-1200.

Daley, W., et al., "Real-Time Color Grading and Defect Detection of Food Products", *SPIE*, vol. 2345, 1995, pp. 403-411.

Delwiche, S., et al., "Predicting Protein Composition, Biochemical Properties, and Dough Handling Properties of Hard Red Winter Wheat Flour by Near-Infrared Reflectance", *Cereal Chemistry*, vol. 75, (4), 1998, pp. 412-416.

Kim, M., et al., "Multispectral Laser-Induced Fluorescence Imaging System for Large Biological Samples", *Applied Optics*, vol. 42, (19), 2003, pp. 3927-3934.

Lawrence, K., et al., "Calibration of a Pushbroom Hyperspectral Imaging System for Agricultural Inspection", *American Society of Agricultural Engineers*, vol. 46, (2), 2003, pp. 513-521.

Park, B., et al., "Hyperspectral Imaging for Detecting Fecal and Ingesta Contaminants on Poultry Carcasses", *American Society of Agricultural Engineers*, vol. 45, (6), 2002, pp. 2017-2026.

Lu, R., et al., "A Near-Infrared Sensing Technique for Measuring Internal Quality of Apple Fruit", *American Society or Agricultural Engineers*, vol. 18, (5), 2002, pp. 585-590.

Lu, R., "Detection of Bruises on Apples Using Near-Infrared Hyperspectral Imaging", *American Society of Agricultural Engineers*, vol. 46, (2), 2003, pp. 523-530.

Mehl, P., et al., "Detection of Defects on Selected Apple Cultivars Using Hyperspectral and Multispectral Image Analysis", *American Society of Agricultural Engineers*, vol. 18, (2), 2002, pp. 219-226.

Park, B., et al., "Multispectral Imaging System for Fecal and Ingesta Detection on Poultry Carcasses", *J. of Food Process Engineering*, vol. 27, 2004, pp. 311-327.

Park, B., et al., "Real-Time Dual-Wavelength Image Processing for Poultry Safety Inspection", *J. of Food Process Engineering*, vol. 23, 2000, pp. 329-351.

Tao, Y., et al., "Detection of Eviscerated Poultry Spleen Enlargement by Machine Vision", *SPIE*, vol. 3544, 1998, pp. 138-145.

Vargas, A., et al., "Detection of Fecal Contamination on Cantaloupes Using Hyperspectral Fluorescence Imagery", *J. of Food Science*, vol. 70, (8), 2005, pp. E471-E476.

Yang, C., et al., "Development of Multispectral Image Processing Algorithms for Identification of wholesome, Septicemic, and Inflammatory Process of Chickens", *J. of Food Engineering*, vol. 69, 2005, pp. 225-234.

Yang, C., et al., "Development of Online Line-Scan Imaging System for Chicken Inspection and Differentiation", *Proc. of SPIE*, vol. 6381, (63810Y), 2006, pp. 1-10.

Yang, C., et al., "Simple Multispectral Image Analysis for Systemically Diseased Chicken Identification", *American Society of Agricultural and Biological Engineers*, vol. 49, (1), 2006, pp. 245-257.

Yang, C., et al., "Development of Fuzzy Logic Based Differentiation Algorithm and Fast Line-Scan Imaging System for Chicken Inspection", *Biosystems Engineering*, vol. 95, (4), 2006, pp. 483-496.

Federal Register, Part II, Department of Agriculture, Food Safety and Inspection Service, 9CFR Part 304, et al., Pathogen Reduction; Hazard Analysis and Critical Control Point (HACCP) Systems; Final Rule, Jul. 25, 1996, pp. 38805-38989.

HACCP-Based Inspection Models Project (HIMP), Young Chicken Inspection, Final Draft 8, Dec. 22, 2004, pp. 1-20.

United States Department of Agriculture, National Agricultural Statistics Service, "Poultry-Production and Value 2006 Summary", Apr. 2007.

* cited by examiner

Region of interest

Pixels classified as wholesome

METHOD AND SYSTEM FOR WHOLESOMENESS INSPECTION OF FRESHLY SLAUGHTERED CHICKENS ON A PROCESSING LINE

BACKGROUND OF THE INVENTION

The present invention relates to an online line-scan imaging system capable of both hyperspectral and multispectral visible/near-infrared reflectance and to a method of using the system to inspect freshly slaughtered chickens on a processing line for wholesomeness and unwholesomeness. The system includes imaging apparatus, methods for image analysis and processing, and methods for use of this system for online inspection.

The Federal Meat Inspection Act of 1906 mandated postmortem inspection of meat and poultry carcasses and authorized the U.S. Department of Agriculture (USDA) to inspect slaughter and processing operations and sanitation for meat and poultry products intended for human consumption. The 1957 Poultry Product Inspection Act mandated postmortem inspection of every bird carcass processed by a commercial facility. Since then, USDA inspectors have conducted on-site organoleptic inspection of all chickens processed at U.S. poultry plants for indications of diseases or defects. Inspectors of the USDA Food Safety and Inspection Service (FSIS) examine by sight and by touch the body, the inner body cavity surfaces, and the internal organs of every chicken carcass during processing operations.

With the 1996 final rule on Pathogen Reduction and Hazard Analysis and Critical Control Point (HACCP) systems (USDA, Final Rule, Fed. Reg., Volume 61, 38805-38989, 1996), FSIS implemented the HACCP and Pathogen Reduction programs in meat and poultry processing plants throughout the country to prevent food safety hazards, to set specific food safety performance standards, and to establish testing programs to ensure that the performance standards are met, through the use of science-based process control systems. More recently, FSIS has also been testing the HACCP-Based Inspection Models Project (HIMP) in a small number of volunteer plants (USDA, Proposed Rule, Fed. Reg., 62: 31553-31562 (1997). HIMP requirements include zero tolerance for unwholesome chickens exhibiting symptoms of "septox"—a condition of either septicemia or toxemia. Wholesome chickens do not exhibit symptoms of "septox".

Septicemia is caused by the presence of pathogenic microorganisms or their toxins in the bloodstream, and toxemia results from toxins produced by cells at a localized infection or from the growth of microorganisms. Septox birds are considered to be unwholesome and USDA inspectors remove these unwholesome birds from the processing lines during their bird-by-bird inspections, which can, by law, be conducted at a maximum speed of 35 birds per minute (bpm) for an individual inspector. The inspection process is subject to human variability, and the inspection speed restricts the maximum possible output for the processing plants while also making inspectors prone to fatigue and repetitive injury problems. This limit on production throughput, combined with increases in chicken consumption and demand over the past 2 decades, places additional pressure on both chicken production and safety inspection system. U.S. poultry plants now process over 8.8 billion broilers annually (USDA, Poultry Production and Value—2006 Summary (2007). During processing at a typical U.S. poultry plant, birds are first slaughtered on kill lines and then transferred to evisceration lines on which inspection stations are located. Commercial evisceration lines in the U.S. currently may be operated at speeds up to 140 bpm; however, such processing lines require up to four inspection stations, each with an FSIS inspector to conduct bird-by-bird inspection at the bpm speed limit.

Machine visiori technologies have been developed to address a variety of food and agricultural processing applications. Various sensing techniques such as RGB (red/green/blue) color imaging, visible and near-infrared (Vis/NIR) spectroscopy and imaging, fluorescence spectroscopy and imaging, and X-ray imaging, have been investigated for potential use in food processing and online inspection applications (Daley et al., Proc. SPIE, 2345: 403-411 (1994); Delwiche et al., Cereal Chem., 75: 412-416 (1998); Chao et al., Applied Engineering in Agriculture, 19(4): 453-458 (2003); Chao et al., Applied Engineering in Agriculture, 20(5): 683-690 (2004); Lu and Ariana, Applied Engineering in Agriculture, 18(5): 585-590 (2002); Lu, Trans. ASAE, 46(2): 523-530 (2003); Kim et al., Applied Optics, 42(9): 3927-3934 (2,002); Mehl et al., Applied Engineering in Agriculture, 18(2): 219-226, 2002; Vargas et al., J. Food Science, 70(8): 471-476 (2003); Chen et al., Applied Optics, 40(8): 1195-2000 (2001).

A variety of methods for imaging whole chicken carcasses and chicken viscera/organs have been investigated for use in food safety inspection of poultry. RGB color imaging of chicken spleens, hearts, and livers was found capable of identifying poultry disease conditions including leucosis, septicemia, airsacculitis, and ascites in the laboratory (Tao et al., Proc. SPIE, 3544: 138-145 (1998); Chao et al., Applied Engineering in Agriculture, 15(4): 363-369 (1999), but these methods required precise presentation of the visceral organs and thus were unsuitable for conventional poultry processing lines. A two-camera system using two wavebands in the visible spectrum for whole-carcass imaging was able to separate 90% of wholesome and unwholesome chickens at processing line speeds up to 70 bpm, but was not feasible for higher speed processing (Park and Chen, J. Food Processing Engineering, 23(5): 329-351 (2000); Chao et al., J. Food Engineering, 51(3): 185-192 (2002).

Thus there remains a need to develop systems that can inspect chickens for wholesomeness in commercial processing lines which operate at speeds of at least 140 bpm.

We have found that with appropriate methods of hyperspectral analysis and algorithms for online image processing, a machine vision system utilizing an EMCCD (Electron-Multiplying Charge-Coupled-Device) camera for multispectral inspection can satisfy both the food safety performance standards and the high-speed production requirements (e.g., at least 140 bpm) of commercial chicken processing. A system of this type can perform food safety inspection tasks accurately and with less variation in performance at high speeds (e.g., at least 140 bpm), and help poultry plants to improve production efficiency and satisfy increasing consumer demand for poultry products.

SUMMARY OF THE INVENTION

It is therefore an object of the present invention is to provide an imaging system for acquisition and processing of hyperspectral and multispectral reflectance images of freshly slaughtered chicken carcasses on processing lines for food safety inspection.

A further object of the present invention is to provide an apparatus and process by which individual chicken carcasses can be detected for hyperspectral and multispectral imaging.

Another object of the present invention is to provide apparatus and processes by which wholesome and unwholesome chicken carcasses can be identified using hyperspectral and multispectral imaging.

A further object of the present invention is to provide apparatus and processes which can identify wholesome and unwholesome chicken carcasses at speeds compatible with the speeds at which chicken processing lines are operated.

A still further object of the present invention is to provide a real-time automated inspection system for whole chicken carcasses which can quickly and accurately identify wholesome and unwholesome chicken carcasses.

Another object of the present invention is to provide a method of hyperspectral reflectance image analysis for determining parameters to be utilized for multispectral reflectance imaging inspection of freshly slaughtered chickens.

A further object of the present invention is to provide a method using multispectral reflectance imaging for inspecting freshly slaughtered chicken carcasses on a poultry processing line for wholesomeness.

Another object of the present invention is to provide a method for inspecting chicken carcasses for wholesomeness by integrating the imaging system of the present invention with commercial chicken processing lines.

A further object of the present invention is to provide an improved inspection process for detecting and for removing or diverting unwholesome birds from chicken processing lines.

Further objects and advantages of the invention will become apparent from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

For useful application to the task of automated chicken carcass inspection, an imaging system must be capable of operating at high speeds compatible with those at which poultry processing lines are operated. Commercial processing lines in the U.S. currently may be operated at speeds up to 140 bpm. The system must accurately detect individual birds on the processing line, process the spectral image data, and produce a classification result. Typical processing plant conditions also necessitate that the imaging system provide adequate illumination of the chicken carcasses for effective imaging. An imaging system capable of inspecting chicken carcasses with high speed and accuracy on a processing line will improve production efficiency of chicken processing plants and improve food safety inspection programs for chicken products.

The present invention concerns in part a line-scan imaging system capable of both hyperspectral and multispectral reflectance imaging for online operation on chicken processing lines, and methods of hyperspectral analysis, multispectral classification of wholesome and unwholesome chickens for food safety inspection, and implementation of the system for operation on chicken processing lines.

Figure 1A:
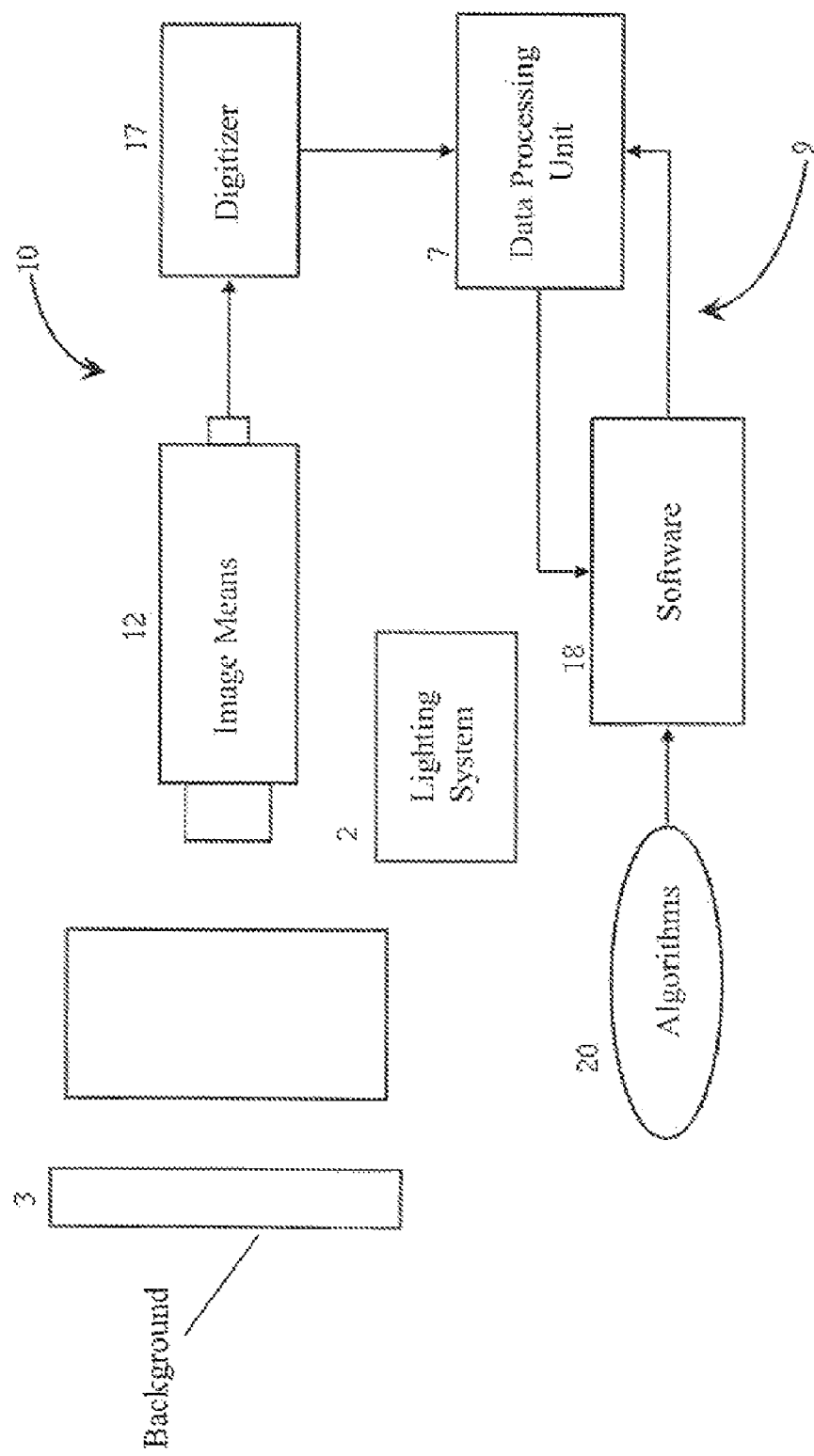
FIG. 1a is a schematic diagram of the arrangement of the hyperspectral/multispectral imaging system for operation on a poultry processing line.
Figure 1B:
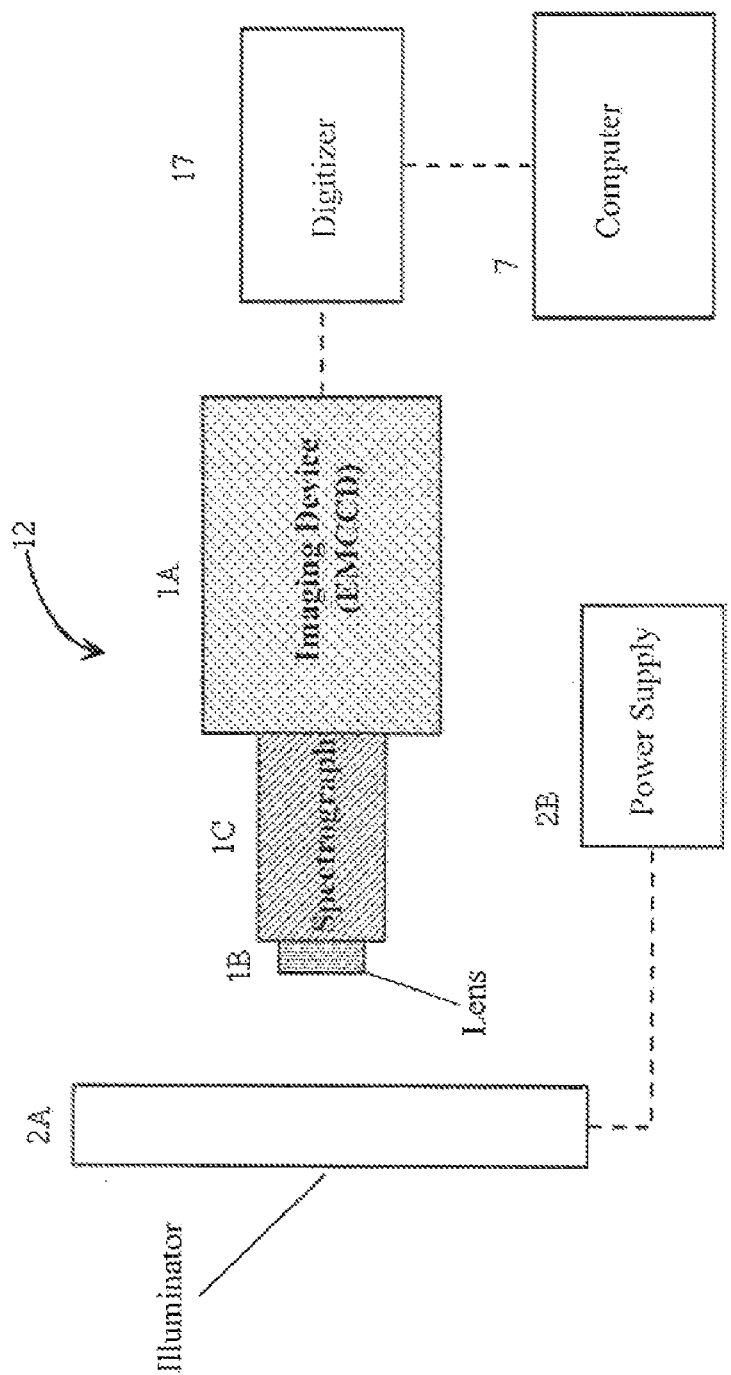
FIG. 1b is a schematic diagram of the components of the hyperspectral/multispectral imaging inspection system.
Figure 1C:
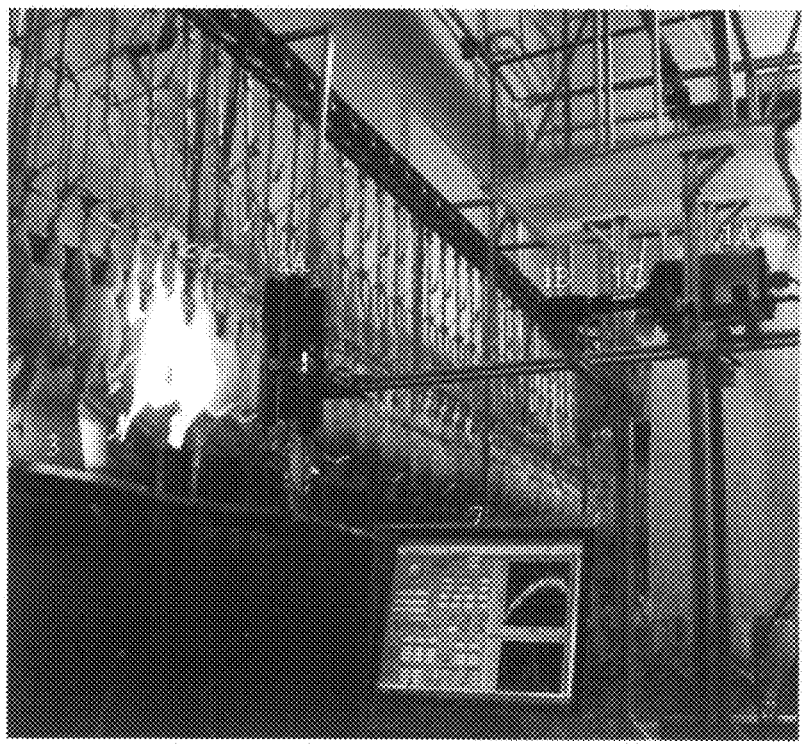
FIG. 1c is a photograph of the hyperspectral/multispectral imaging inspection system on a commercial chicken processing line.

Imaging system 10 (FIG. 1a) includes a means for obtaining spectral images 12, a lighting system 2, a means of providing a dark non-reflective imaging background 3, and a data processing unit 7. One embodiment of the present invention includes a hyperspectral/multispectral imaging system 10 (FIG. 1b). Hyperspectral/multispectral imaging system 10 includes at least a means for obtaining spectral images 12, such as, for example, an Electron-Multiplying Charge-Coupled-Device (EMCCD) imaging detector 1A; a lighting system 2; and a data processing unit 7. The means for collecting spectral images 12 for purposes of this embodiment includes an Electron-Multiplying Charge-Coupled-Device (EMCCD) 1A, a lens assembly 1B, and a line-scan spectrograph 1C.

Device 1A can be an Electron-Multiplying Charge-Coupled-Device (EMCCD). Examples of EMCCD include, for example, PhotonMAX 512b (Roper Scientific, Inc., Trenton, N.J.) and iXon and Luca (Andor Technology Limited, CT). EMCCD-based cameras can accommodate low-light imaging environments and both hyperspectral and multispectral imaging of rapidly moving targets. Their high quantum efficiencies, rapid frame-transfer mechanisms, and pre-output signal amplification via electron-multiplication also allow significantly improved signal-to-readout-noise ratios. When utilized for line-scan imaging, software controls for an EMCCD camera eliminate the need for the mechanical operation of a shutter and can operate the same camera for either hyperspectral or multispectral imaging without necessitating hardware adjustments. Consequently, wavelengths selected through hyperspectral analysis (described below) can be easily implemented for high-speed multispectral imaging of moving targets without the need for cross-system calibration.

Line-scan spectrograph 1C such as Hyperspec-VNIR Series C (Headwall Photonics, Inc., Fitchburg, Mass.) or ImSpector V10 (Specim/Spectral Imaging Ltd., Oulu, Finland), has a nominal spectral range of about 400 nm to about 1000 nm and attaches to the EMCCD imaging detector 1A for generating line-scan images. Lens assembly 1B includes a C-mount lens such as, for example, a Xenoplan (Schneider, Haugppauge, N.Y.) or a Nikkor (Nikon Inc., Melville, N.Y.) lens and attaches to line-scan spectrograph 1C.

Imaging Device 1A has approximately 512×512 pixels and is thermoelectrically cooled to approximately −70° C. (for example via a three-stage Peltier device). The imaging device is coupled with a 14-bit or 16-bit digitizer 17, such as ST-133 (Roper Scientific, Inc., Trenton, N.J.) or CCI-23 (Andor Technology Limited, CT) with a pixel-readout rate of approximately 10 MHz to 30 MHz. An imaging spectrograph 1C (ImSpector V10, Specim/Spectral Imaging Ltd., Oulu, Finland), and a C-mount lens 1B (Rainbow CCTV S6x11, International Space Optics, S.A., Irvine, Calif.) are attached to the EMCCD Imaging Device 1A. The spectrograph aperture slit of approximately 50 microns limits the instantaneous field of view (IFOV) of the imaging system to a thin line. Light from the linear IFOV is dispersed by a prism-grating-prism line-scan spectrograph and projected onto the EMCCD Imaging Device 1A. The spectrograph creates a two-dimensional (spatial and spectral) image for each line-scan, with the spatial dimension along the horizontal axis and the spectral dimension along the vertical axis of the EMCCD Imaging Device 1A.

The image signals provided by the means for obtaining spectral images 12 are input to a computer 7 via a 14-bit or 16-bit digitizer 17, such as the ST-133 (Roper Scientific, Inc., Trenton, N.J.). The digitizer 17 performs rapid analog-to-digital conversion of the image data for each hyperspectral or multispectral line-scan image. These data are then processed by the computer 7 for image analysis and classification of wholesome and unwholesome pixels in the line-scan images.

The hyperspectral/multispectral imaging system requires lighting system 2. Lighting system 2 includes an illuminator 2A with at least 10000 lux (lumen/m$^2$) intensity and excitation wavelengths between about 400 nm and about 800 nm, such as for example, two pairs of high power, broad-spectrum white light-emitting-diode (LED) line lights (LL6212, Advanced Illumination, Inc., Rochester, Vt.) and a line-regulated direct current power supply 2B, such as for example a Sola/Hevi-Duty S6 10A 24V DC power supply (EGS Electrical Group, Rosemont, Ill.). The lighting system is controlled manually. The hyperspectral/multispectral imaging system requires a means of providing a dark, non-reflective imaging background 3 such as, for example, a black non-reflective matte-surface acrylic or fabric panel.

The theoretical development of algorithms 20 which are used for this purpose is based on the difference between spectral reflectance of wholesome chickens versus that of unwholesome chickens. The assumption was made that a mathematical combination of remotely sensed spectral bands could be used to identify wholesome chickens and unwholesome chickens. The results generated by such a combination of spectral bands corresponds to the color of chicken tissue in a given image pixel as affected by the wholesomeness or unwholesomeness of the bird. The end result of such computer analysis is the generation of a qualitative analysis such as a "wholesome/unwholesome" determination for each chicken that passes in front of the means for obtaining spectral images. The developed algorithms 20 are implemented using commercial software 18 such as MATLAB (MathWorks, Natick, Mass.) and LabView (National Instruments Corp., Austin, Tex.).

Figure 2:
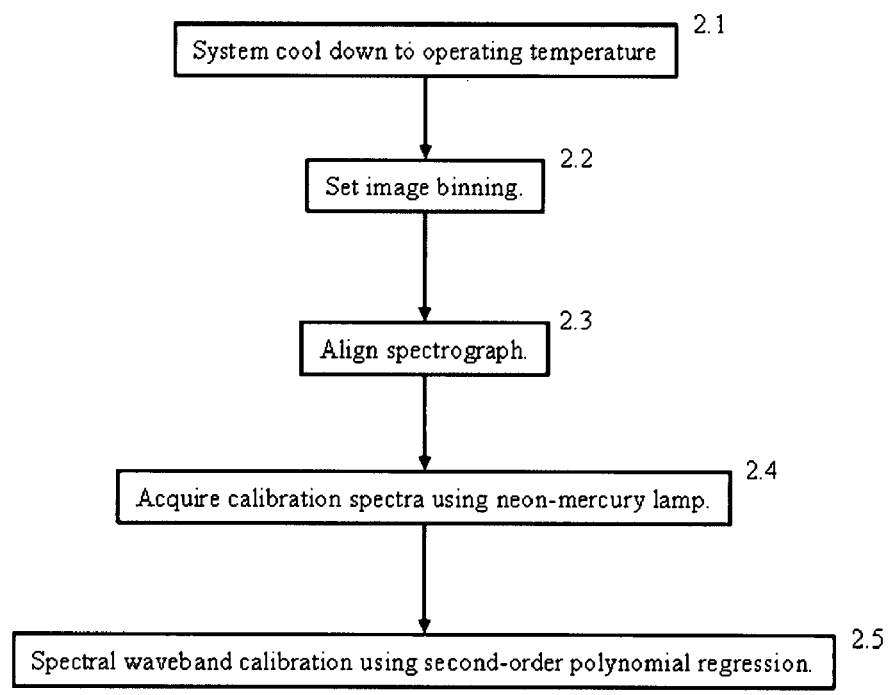
FIG. 2 is a flowchart of the calibration process for the hyperspectral/multispectral imaging inspection system.

Hyperspectral/multispectral imaging system 10 requires calibration before line-scan images can be acquired. Re-calibration is generally not required unless the physical arrangement of the components of the imaging system is disturbed. The first step in the calibration process was to cool the imaging system to its operating temperature of −70° C. (FIG. 2, Box 2.1). The next step was to set image binning, which is determined by the spectral distribution of useful wavelengths and the size of spatial image features to be processed for the application (FIG. 2, Box 2.2). The original image size, 512×512 pixels, was reduced by 1×4 binning to result in line-scan images with a spatial resolution of 512 pixels (512 divided by 1) and a spectral resolution of 128 pixels (512 divided by 4) in the spectral dimension. The binning process adds together photons from adjacent pixels in the detector array and was performed by the shift register of the EMCCD Imaging Device 1A. This produced a reduced number of pixels to be digitized by the 16-bit A/D PCI board for the computer 7 to process. Reducing total pixel readout time decreased the acquisition time of each line-scan image, which allowed higher image acquisition speed for the EMCCD Imaging Device 1A. Because the useful spectrum of light did not span the entire width of the EMCCD Imaging Device 1A, the first 20 and last 53 spectral channels were discarded, resulting in a final line-scan image size of 512×55 pixels for hyperspectral imaging.

The next step in the calibration process was physical alignment of the spectrograph 1C to ensure uniform waveband dispersal across the spectral dimension for each spatial pixel. This alignment was ascertained by examining the spectral dispersal of the 55 wavebands for each of the 512 spatial pixels for a line-scan image: the highest intensity value among all 55 wavebands should occur at the same spectral coordinate for each of the 512 spatial pixels (FIG. 2, Box 2.3).

The next step in the calibration process was spectral waveband calibration that identified each spectral channel with a specific wavelength. A neon-mercury calibration lamp (Oriel Instruments, Stratford, Conn.) provided spectral reference peaks (FIG. 2, Box 2.4) for calibration using the following second-order polynomial regression:

$$\lambda = 0.01 \times n_c^2 + 6.03 \times n_c + 393.70$$

where $\lambda$ is the wavelength in nm and $n_c$ is the spectral channel number (FIG. 2, Box 2.5). The spectral range of the line-scan images began at 399.94 nm for the first channel and ended at 750.42 nm for the $55^{th}$ channel.

Figure 3:
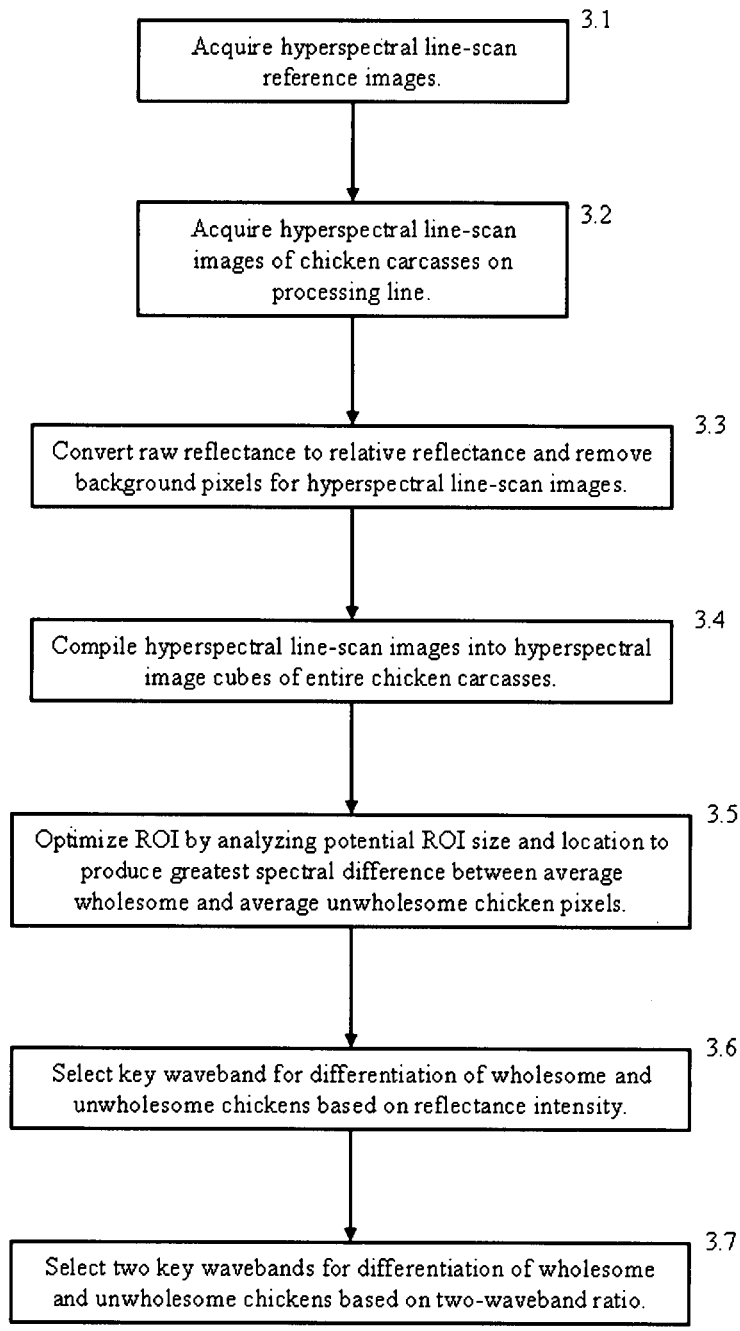
FIG. 3 is a flowchart of the hyperspectral analysis method for determination of the region of interest (ROI) and key wavebands required to conduct multispectral imaging inspection of chickens for wholesomeness.

Following system calibration, the hyperspectral/multispectral imaging system 10 was ready to be used for the acquisition of reference line-scan images. Prior to acquiring hyperspectral chicken images, acquisition of a white reference image was performed using a 99% diffuse reflectance standard (Spectralon, LabSphere, Inc., North Sutton, N.H.) illuminated by lighting system 2; acquisition of a dark reference image was performed by acquiring an image with the lens covered by a non-reflective opaque black fabric (FIG. 3, Box 3.1). These reference line-scan images were used to calculate the pixel-based relative reflectance for raw hyperspectral line-scan images as follows:

$$I = \frac{I_0 - D}{W - D}$$

where I is the relative reflectance, $I_0$ is the raw reflectance, D is the dark reference, and W is the white reference (FIG. 3, Box 3.3).

Following acquisition of raw hyperspectral line-scan images of chickens (FIG. 3, Box 3.2) and conversion to relative reflectance images (FIG. 3, Box 3.3), analysis of the hyperspectral relative reflectance images began with removal of the background. A relative reflectance threshold value of 0.1 was set for the 620 nm waveband. For any spatial pixel in the hyperspectral reflectance image, the pixel was identified as a background pixel if its reflectance at 620 nm was lower than the 0.1 threshold value. The value of the relative reflectance for every pixel identified as a background pixel was re-assigned to be zero, thus removing these pixels from further image analysis (FIG. 3, Box 3.3).

The background-removed relative reflectance line-scan images were compiled to form hyperspectral image cubes of entire wholesome and unwholesome chicken carcasses (FIG. 3, Box 3.4). Using MATLAB software, (MathWorks, Natick, Mass.), the hyperspectral chicken images were then analyzed to optimize the spatial Region of Interest (ROI) within the chicken images (FIG. 3, Box 3.5). The optimized ROI was one which provided the greatest spectral difference between averaged wholesome pixels and averaged unwholesome pixels across all 55 wavebands, which was obtained as follows: Within a bird image, the potential ROI area spanned from an upper border across the breast of the bird to a lower border at the lowest non-background spatial pixel in each line scan, or to the last ($512^{th}$) spatial pixel if there were no background pixels present at the lower edge of the image. The average relative reflectance spectrum was calculated across all ROI pixels for all wholesome chicken images, and the average relative reflectance spectrum was calculated across all ROI pixels for all unwholesome chicken images. The difference spectrum between the wholesome and unwholesome average spectra was calculated. This calculation was performed for potential ROIs of varying size, as defined by the number of ROI pixels and their vertical coordinate locations within each line-scan, to optimize the ROI size and location by selecting the ROI that produced the greatest maximum value in its difference spectrum. Using the optimized ROI, the waveband corresponding to the greatest spectral difference between averaged wholesome chicken pixels and averaged unwholesome chicken pixels was identified as a key waveband for differentiation of wholesome and unwholesome chicken carcasses by relative reflectance intensity (FIG. 3, Box 3.6). Again using the optimized ROI, the average wholesome and average unwholesome spectra were analyzed and potential two-waveband ratios were identified as several ratios using wavebands at which the average wholesome and average unwholesome chicken pixel spectra showed local maxima and local minima. The value of each potential band ratio was calculated for the average wholesome chicken pixels and for the average unwholesome chicken pixels. The two-waveband ratio showing the greatest difference in ratio value between average wholesome and average unwholesome chicken pixels was identified for use in differentiating wholesome and unwholesome chicken carcasses (FIG. 3, Box 3.7). Multispectral imaging inspection used the key wavelength and the two-waveband ratio to differentiate between wholesome and unwholesome chicken carcasses.

Effective multispectral imaging inspection of wholesome and unwholesome chicken carcasses on a processing line required the capacity for detecting individual bird carcasses, classifying the condition of the chicken carcass, and generating a corresponding output useful for process control, at speeds compatible with online processing line operations. LabVIEW 8.0 (National Instruments Corp., Austin, Tex.) was used to control hyperspectral/multispectral imaging system 10 to perform the tasks required for multispectral inspection of chicken carcasses on a poultry processing line. The line-by-line mode of operation was the basis of the following algorithm that was developed to detect the entry of a bird carcass into the IFOV.

Figure 4:
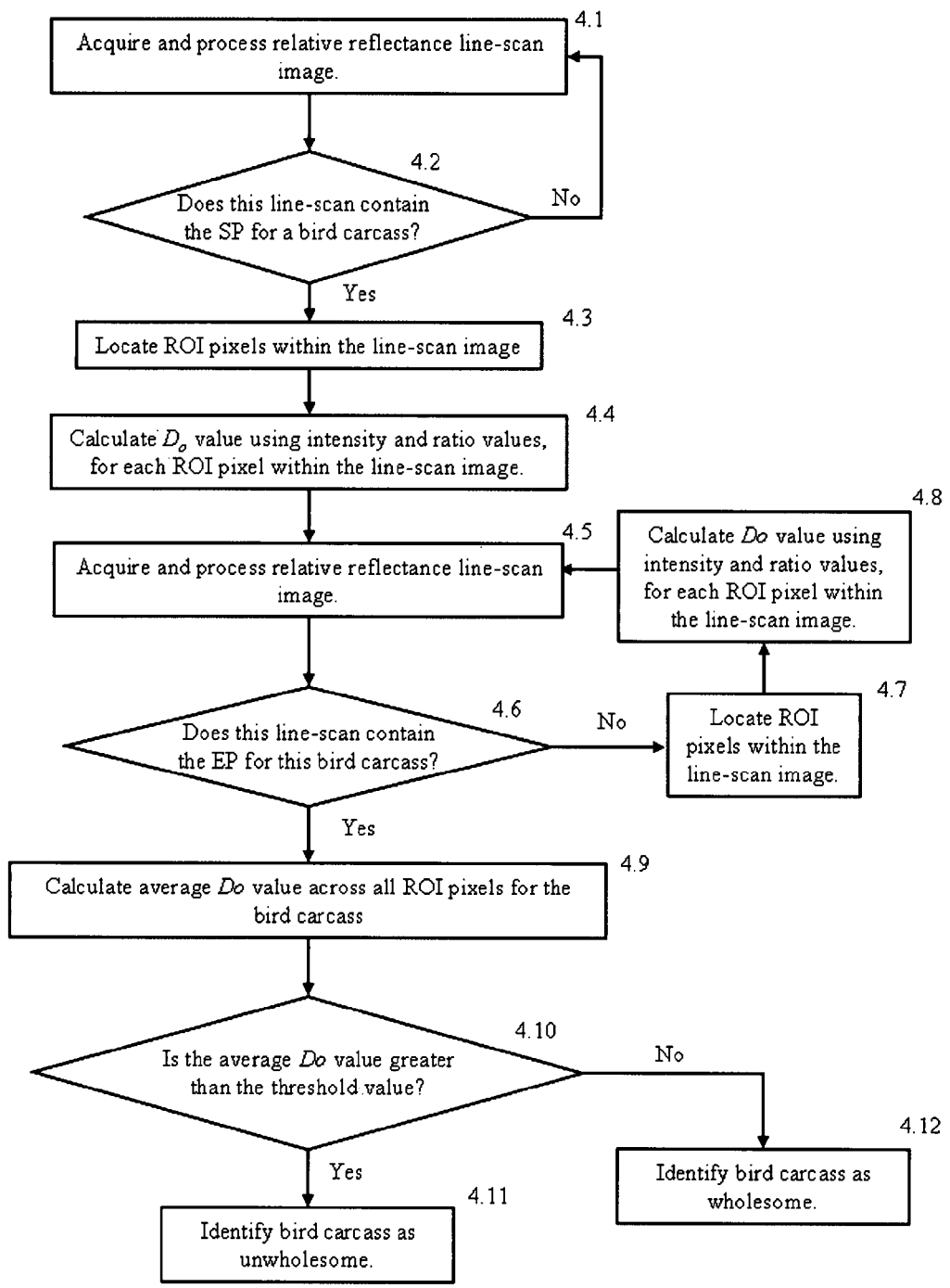
FIG. 4 is a flowchart of the method for online multispectral line-scan imaging inspection of chickens for wholesomeness.

FIG. 4 shows the line-by-line algorithm for multispectral inspection to detect and classify wholesome and unwholesome chicken carcasses on a processing line. First, a line-scan image was acquired that contains only raw reflectance values at the two key wavebands needed for intensity and ratio differentiation, the raw reflectance data was converted into relative reflectance data, and background pixels were removed from the image (FIG. 4, Box 4.1). The line-scan image was checked for the presence of the SP (Starting Point) of a new bird (FIG. 4, Box 4.2); if no SP was present, no further analysis was performed for this line-scan image and a new line-scan image was acquired. If the line-scan was found to contain an SP, then the ROI pixels were located (FIG. 4, Box 4.3) and the $D_o$ value was calculated for each pixel in the ROI of the line-scan image (FIG. 4, Box 4.4). With each new line-scan image acquired (FIG. 4, Box 4.5), the ROI pixels were located, and the decision output value of $D_o$ was calculated for each pixel, until the EP (Ending Point) was detected (FIG. 4, Box 4.6), indicating no additional line-scan images to be analyzed for the bird carcass. The average $D_o$ value for the bird was calculated (FIG. 4, Box 4.9) and compared to the threshold value (FIG. 4, Box 4.10) for the final determination of wholesomeness or unwholesomeness for the bird carcass (FIG. 4, Boxes 4.11 and 4.12).

With the acquisition of each new line-scan image at the start of the detection algorithm, (FIG. 4, Box 4.1), the relative reflectance at 620 nm was examined for each of the first (uppermost) 256 pixels of the line-scan image. The value of the relative reflectance at 620 nm was always at a low-intensity (below 0.1) for these pixels when there was no chicken carcass present in the IFOV. When the relative reflectance at 620 nm increased above 0.1 for any single pixel among the uppermost 256 pixels in the line-scan image, this indicated that a chicken carcass has entered the IFOV. This indication assumed that the inverted chicken carcass was correctly hung from the processing line shackle by both legs and that the entry of the first leg into the IFOV is triggering the detection. The detection algorithm examined only the uppermost 256 pixels in order to disregard carcass wings which were always overlapped between adjacent carcasses on the processing line. After detecting a line-scan image with a single pixel among the uppermost 256 exhibiting relative reflectance greater than 0.1 at 620 nm, the subsequent line-scan images were monitored as additional pixels within the 256 pixels began showing relative reflectance values greater than 0.1 (FIG. 4, Box 4.2). Between the first detected pixel and the 256$^{th}$ pixel, pixels below the first detected pixel began increasing in relative reflectance as the chicken continues to move across the field of view. There would eventually be a line-scan image with one (or several) low-intensity pixels left that was located below the first detected pixel, and above or at the 256$^{th}$ pixel, which was immediately followed by another line-scan in which the previous line-scan's last low-intensity pixel(s) had increased above 0.1. The last low-intensity pixel, or the pixel in the center of the last contiguous group of remaining low-intensity pixels, was identified as the Starting Point (SP) of the bird carcass and represented the junction between the thigh and the abdomen on the leading edge of the carcass.

Similar to the above algorithm, the following algorithm was developed to detect the last relevant line-scan image for each bird as it passed through the IFOV (FIG. 4, Box 4.6). After the SP was detected, each subsequent line-scan image was analyzed to determine if the relative reflectance intensity at 620 nm for the pixel matching the vertical coordinate of the SP was above or below 0.1 When a line-scan image was acquired for which that pixel had a relative reflectance intensity at 620 nm that was below 0.1, this pixel was identified as the Ending Point (EP) of the bird carcass, indicating that the main body of the bird had already passed through the IFOV and no further line-scans should be analyzed for that specific bird carcass.

After the initial identification of the SP for a bird carcass, the line-scan image containing the SP and subsequent line-scan images up to the one containing the EP were analyzed, line-by-line (FIG. 4, Boxes 4.3 through 4.8), using the following algorithm to classify the bird carcass. For each line-scan image, fuzzy logic membership functions were used to produce two decision outputs for each non-background pixel in the line-scan image that was located within the ROI, using the ROI and waveband parameters previously determined through hyperspectral imaging analysis. For each pixel, two fuzzy logic membership functions were used to generate wholesome and unwholesome fuzzy membership values $w_1$ and $u_1$, corresponding to wholesome and unwholesome chickens, from the key wavelength reflectance intensity value for that pixel. Two additional fuzzy logic membership functions were used to generate wholesome and unwholesome fuzzy membership values $w_2$ and $u_2$, corresponding to wholesome and unwholesome chickens, from the ratio value for that pixel. The fuzzy inference engine executed a min-max operation (Chao, K., et al., Appl. Eng. in Agric., 15(4): 363-369 (1999)) to obtain a decision output $D_o$ for each pixel based on the n membership functions as follows, where n is the number of criteria input used (in this case, n=2):

$$D_o = \max[\min\{w_1 \ldots w_n\}, \min\{u_1 \ldots u_n\}]$$

For each pixel, the value of $D_o$ was in the range between 0 and 1, where 0 indicates 100% possibility of wholesomeness and 1 indicated 100% possibility of unwholesomeness. When the EP for that bird carcass was encountered, the average $D_o$ value for all ROI pixels for that bird was calculated (FIG. 4, Box 4.9). The bird carcass was identified as being unwholesome if the average $D_o$ value was greater than 0.6; otherwise the chicken carcass was identified as being wholesome (FIG. 4, Boxes 4.10, 4.11, 4.12).

The hyperspectral/multispectral imaging inspection system demonstrated classification accuracies greater than 90% on commercial processing lines which were operated at speeds of 70 bpm and 140 bpm. Current processing operations in U.S. poultry plants are allowed to run at speeds up to 140 bpm.

The following examples are intended only to further illustrate the invention and are not intended to limit the scope of the invention which is defined by the claims.

EXAMPLES

Example 1

Figure 5:
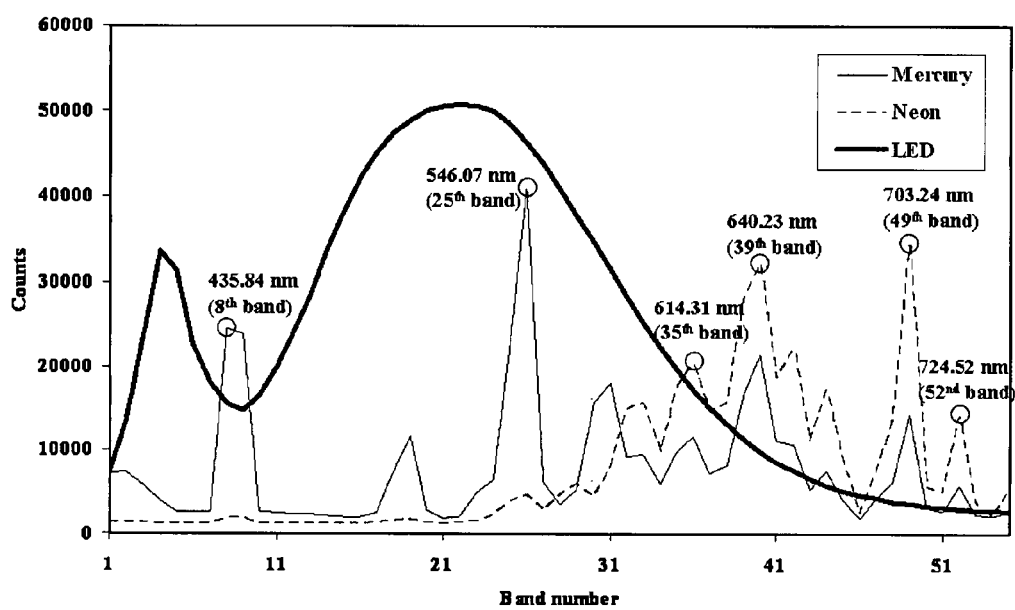
FIG. 5 is a graph of the reflectance spectra of a Spectralon diffuse reflectance standard when illuminated by the white LED line lights and by a mercury and neon calibration pen lamp.
Figure 6:
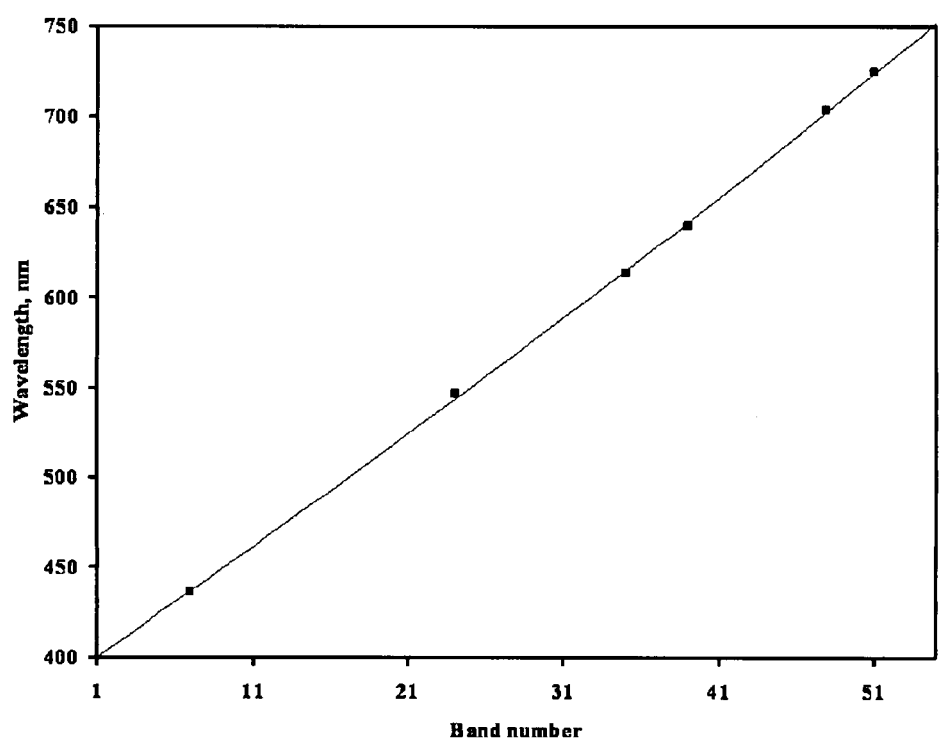
FIG. 6 is a graph of the second-order polynomial regression model used for spectral calibration of the imaging inspection system using a binning of 1 by 4.

Calibration of the imaging system 10 was conducted for the acquisition of hyperspectral chicken images on a commercial processing line. Following the cooling of the EMCCD detector to the necessary −70° C. operating temperature, spectral images were acquired using a mercury-neon pen lamp. With 1 by 4 binning (4× binning in the spectral dimension), the mercury and neon reference peaks shown in FIG. 5 were utilized for spectral calibration; the mercury peaks at 435.84 and 546.07 nm were found to correspond to the 8$^{th}$ and 25$^{th}$ bands, respectively, and neon peaks at 614.31, 640.23, 703.24, and 724.52 nm corresponded to the 35$^{th}$, 39$^{th}$, 49$^{th}$, and 52$^{nd}$ bands, respectively. FIG. 6 shows a plot of the second-order polynomial regression that was calculated from the mercury and neon spectral peaks to calibrate the spectral axis:

$$\text{wavelength (nm)} = 0.01X^2 + 6.03X + 393.70 \, (r^2 = 0.9999)$$

where X is the spectral band number. The imaging spectrum ranged from 399.94 nm (the first band) to 750.42 nm (the 55$^{th}$ band) with an average bandwidth of 6.02 nm. The distance between the lens and IFOV target area was 914 mm, with the LED line lights illuminating the IFOV target area from a distance of 214 mm. The IFOV spanned 177.8 mm, which translated into 512 spatial pixels, with each pixel representing an area of 0.12 mm$^2$.

Example 2

Figure 7:
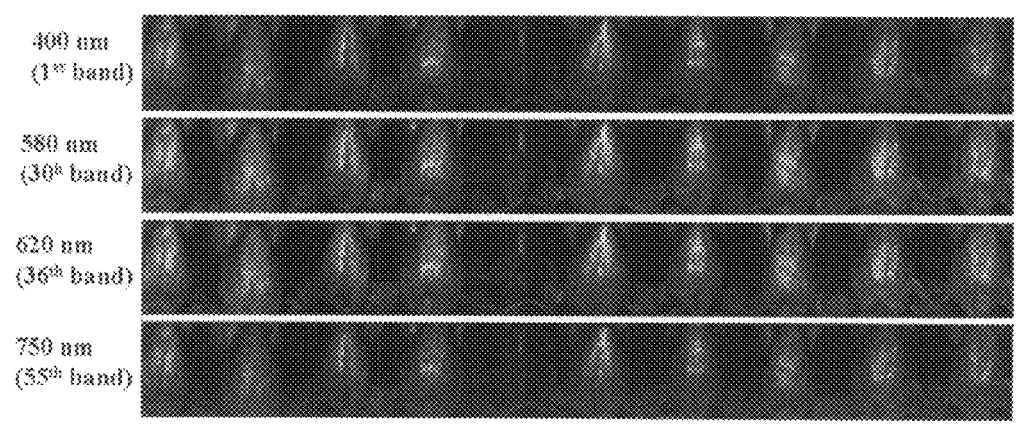
FIG. 7 shows images at four spectral wavebands of chicken carcasses that were acquired during hyperspectral line-scan imaging on the chicken processing line.

Using the calibration from Example 1 above, hyperspectral images were acquired using imaging system 10 for 5549 wholesome chicken carcasses and 93 unwholesome chicken carcasses on a 140 bpm commercial processing line, for analysis to optimize the ROI size and location and to determine the key intensity waveband and ratio wavebands to be used for online inspection. The wholesome or unwholesome condition of the birds on the line was identified by an FSIS veterinarian who observed the birds before they passed through the illuminated IFOV, where the imaging system acquired 55-band hyperspectral data for the chicken carcasses. FIG. 7 shows example images, at four bands, of chickens on the processing line, including one unwholesome chicken (fifth from the left) among the series in the image. The images shown were compiled using image data from the 1$^{st}$, 30$^{th}$, 36$^{th}$, and 55$^{th}$ spectral bands, corresponding to 400 nm, 580 nm, 620 nm, and 750 nm.

Figure 8:
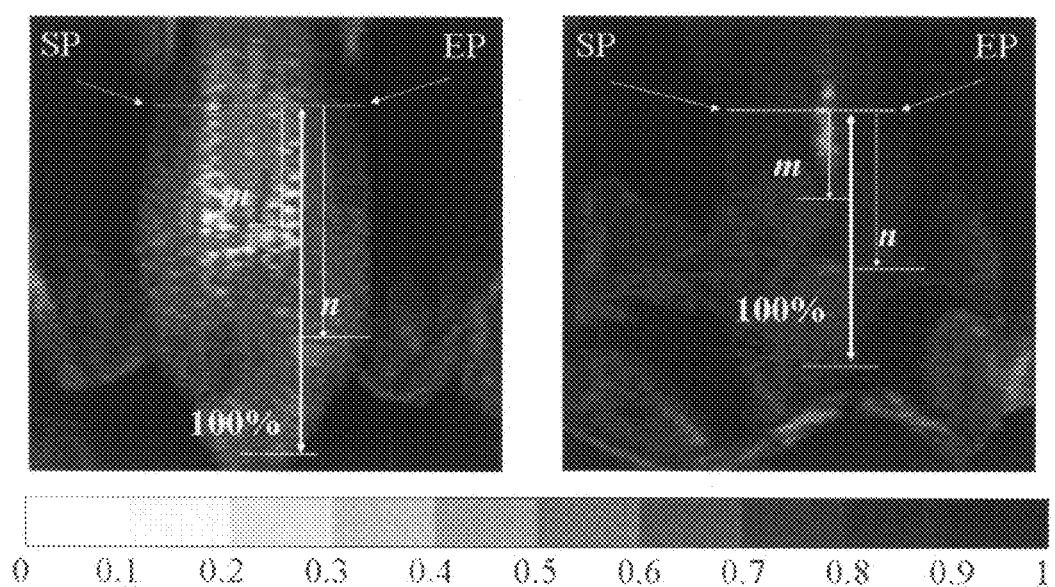
FIG. 8 shows a contour image of two chicken carcasses marked with example locations of the SP (Starting Point), EP (Ending Point), m, and n parameters (described below) used for locating the ROI.

The hyperspectral images were analyzed to optimize the ROI size and location and the key wavebands for differentiation by reflectance intensity and by waveband ratio. FIG. 8 shows a contour image of two examples of chicken carcasses with the SP and EP marked and connected by a line on each. The possible size and location of the ROI is described by parameters m and n, which extended below the SP-EP line. The values of m and n indicated, by percentage of the pixel length between the SP-EP line and the furthest non-background pixel below the SP-EP line, the location of the upper and lower ROI borders. The possible locations of the upper ROI border ranged between a 10% and 40% distance below the SP-EP line, and the possible locations of the lower ROI border range between a 60% and 90% distance below the SP-EP line.

Figure 9:
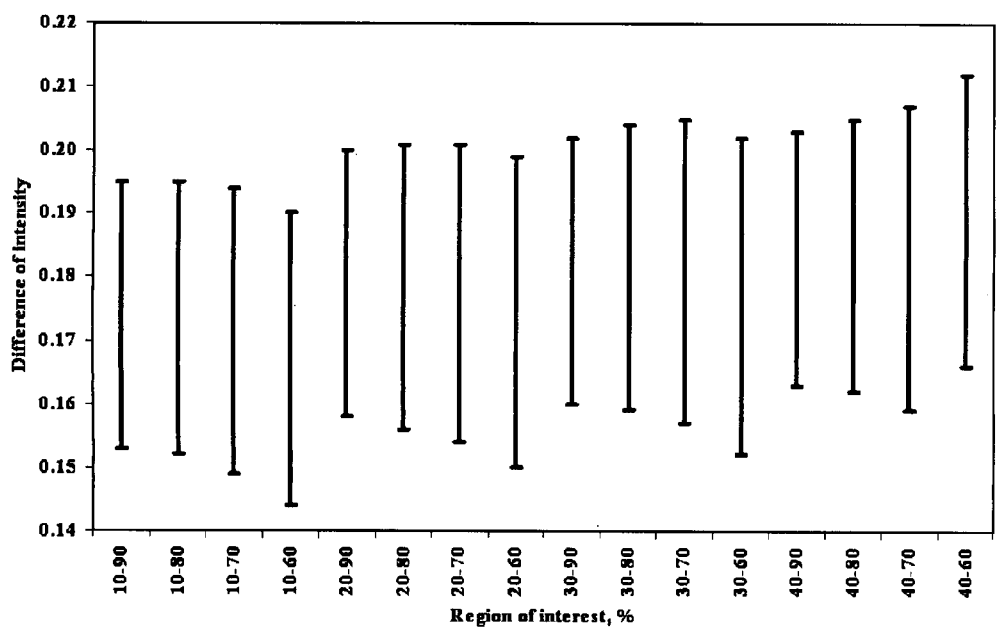
FIG. 9 is a graph of the range, for each possible ROI, of difference values between average wholesome and average unwholesome chicken spectra, for optimizing the ROI to be used for inspection of chickens.
Figure 10:
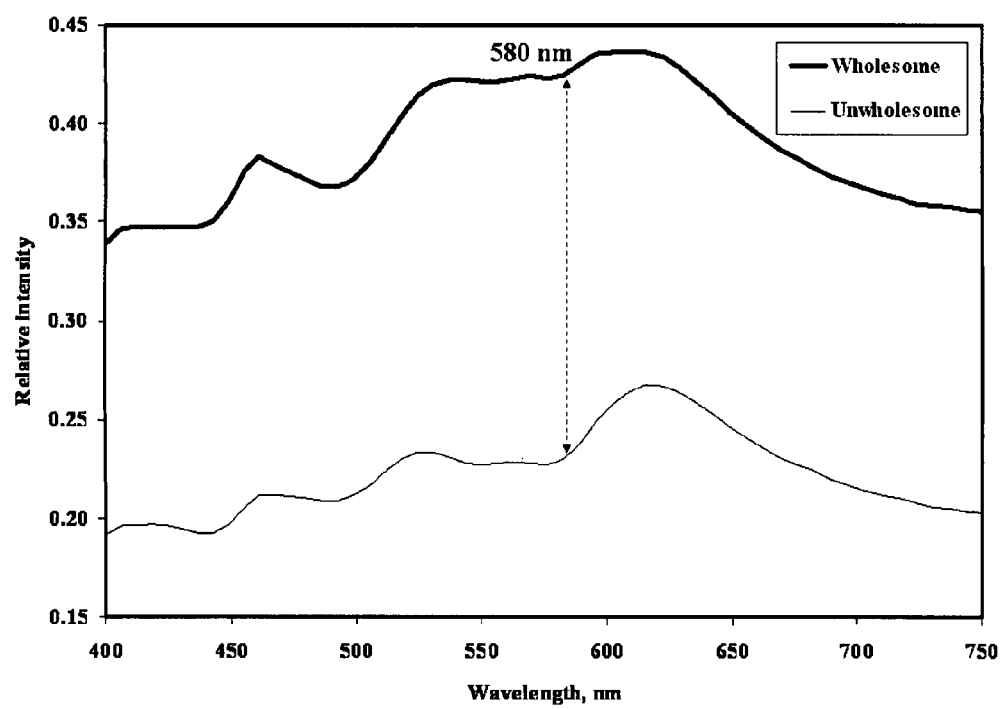
FIG. 10 is a graph of average wholesome and average unwholesome chicken spectra, highlighting the 580 nm key waveband that can be used for intensity-based differentiation of wholesome and unwholesome chickens.

For each possible ROI, the average spectrum across all ROI pixels from the 5549 wholesome chicken carcasses, and the average spectrum across all ROI pixels from the 93 unwholesome chicken carcasses, were calculated. The difference between the average wholesome and average unwholesome value at each of the 55 bands was calculated and their range for each possible ROI is shown in FIG. 9. Because the 40%-60% ROI showed the range with the greatest difference values between the average wholesome and unwholesome spectra, this ROI was considered the optimized ROI to be used for multispectral inspection. As shown in FIG. 10, the $30^{th}$ band showed the greatest difference between the average wholesome and the average unwholesome spectra from among all 55 bands for the optimized ROI; this band, corresponding to 580 nm, was selected as the key waveband to be used for intensity-based differentiation of wholesome and unwholesome chicken carcasses.

Figure 11:
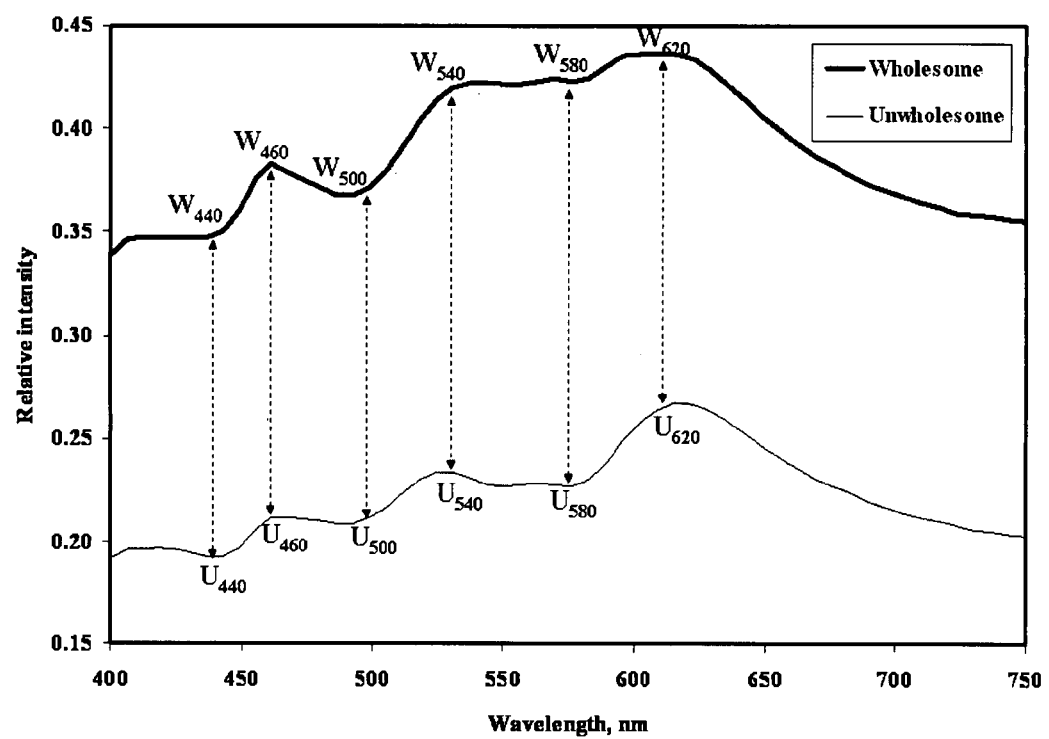
FIG. 11 is a graph of the average wholesome and average unwholesome chicken spectra, highlighting possible key wavebands that can be used for two-waveband ratio differentiation of wholesome and unwholesome chickens.

FIG. 11 shows the average wholesome and average unwholesome chicken spectra, marked with the wavebands that were investigated for differentiation of wholesome and unwholesome chicken carcasses by a two-waveband ratio. The average ratio values were calculated for three possible two-waveband ratios:

$$W_{440}/W_{460} - U_{440}/U_{460} = 0.003461$$

$$W_{500}/W_{540} - U_{500}/U_{540} = 0.038602$$

$$W_{580}/W_{620} - U_{580}/U_{620} = 0.115535$$

Figure 12:
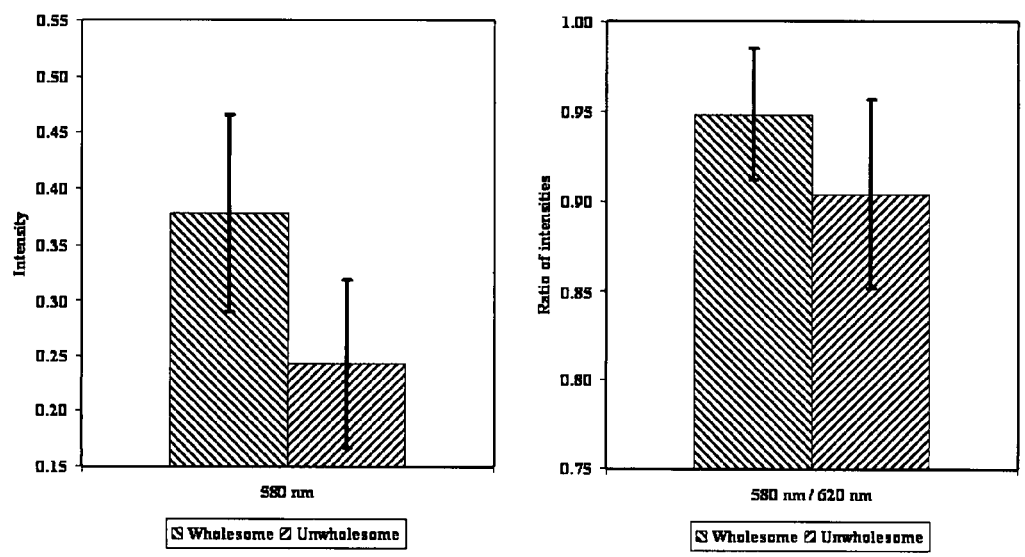
FIG. 12 is a graph of the mean and standard deviation for intensity value at key waveband 580 nm, and a second graph of the mean and standard deviation for ratio value using 580 nm and 620 nm, for wholesome and unwholesome chickens.

The last ratio, using the 580 nm and 620 nm wavebands, showed the greatest difference between the average wholesome and average unwholesome chicken spectra and was thus selected for use in differentiation by two-waveband ratio. FIG. 12 shows plots of the mean and standard deviation for the 580 nm key waveband and for the key waveband ratio using 580 nm and 620 nm, for wholesome and unwholesome chickens in the hyperspectral image data set.

Example 3

Figure 13:
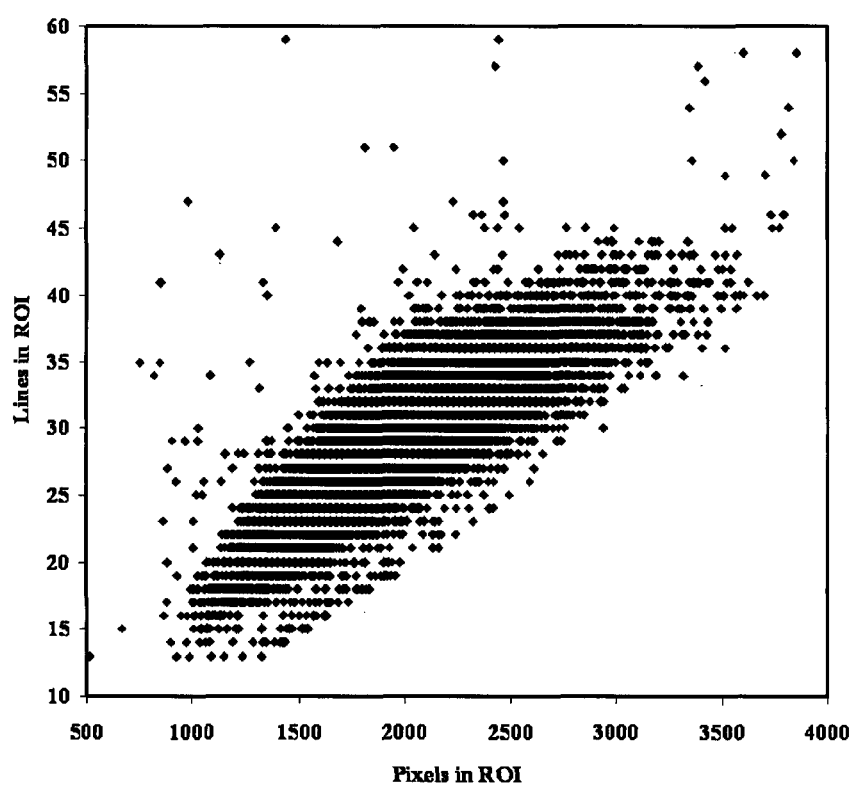
FIG. 13 is a scatterplot graph of the distribution of chicken carcasses ima ged during multispectral inspection. by the number of ROI pixels and the number of ROI lines for each chicken.
Figure 14:
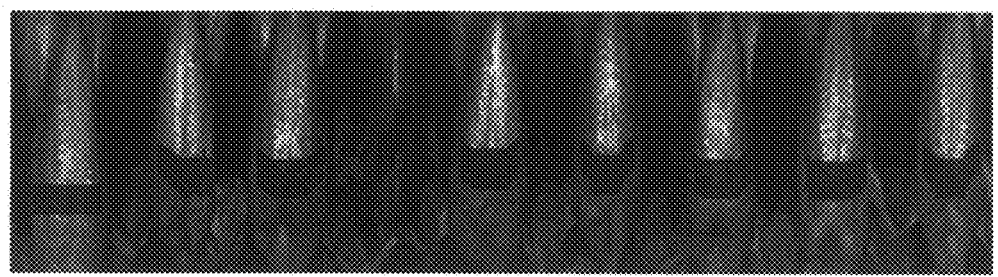
FIG. 14 is an image of nine chickens with the optimized ROI highlight on each chicken.

The optimized ROI and key wavebands determined in Example 2 above were used for multispectral inspection of over 100,000 chickens on a 140 bpm processing line during two 8-hour shifts at a commercial poultry plant. FIG. 14 shows examples of chicken images highlighting the ROI that was used for online inspection. The inspection program specifically determined the 40%-60% ROI for each bird, which was clearly affected by the size and position of the bird. The ROI was a regular rectangular area for a bird whose body extended past the lower edge of the image, such as the first bird in FIG. 14. For other birds, the presence of background pixels near the lower edge of the image resulted in irregularly shaped ROIs. FIG. 13 shows a scatter plot for the chickens inspected during the first shift, by the number of ROI pixels and the number of ROI lines for each bird. For 99% of the birds imaged during the first 8-hour inspection shift, imaging system 10 acquired between 15 and 40 ROI line-scan images, resulting in 1000-3500 ROI pixels for classification analysis. A very small number of data points in FIG. 13 showed an unusually high number of ROI lines and ROI pixels, or a high number of ROI lines with very few ROI pixels. These data points resulted from occasional occurrences of birds that were not correctly hung or that were unusually positioned, such as being hung by one leg or being hung by two legs but on separate shackles, that may have prevented clear distinction between individual adjacent birds by the imaging system or resulted in an elevated position within the IFOV.

Table 1 below shows the mean and standard deviation values for relative reflectance at 580 nm for wholesome and unwholesome birds in three data subsets drawn from the hyperspectral data analysis using the 40%-60% ROI in Example 2 and each of the two inspection shifts in Example 3. Table 2 shows the mean and standard deviation values for the two-waveband ratio using 580 nm and 620 nm for wholesome and unwholesome birds for the same three data subsets. Paired t-tests showed no significant differences (P=0.05) between the three data sets for the wholesome means, and similarly no significant difference between the three data sets for the unwholesome means. This demonstrates that when the hyperspectral/multispectral imaging system 10 is appropriately and consistently operated to maintain proper distance and illumination conditions, hyperspectral data collected by the system can be appropriately used for multispectral inspection conducted at different times and locations.

TABLE 1

Mean and standard deviation values for reflectance intensity at 580 nm for wholesome and unwholesome chicken images

|  | Wholesome | | Unwholesome | |
| --- | --- | --- | --- | --- |
|  | Mean | SD | Mean | SD |
| Hyperspectral Analysis | 0.378 | 0.088 | 0.243 | 0.076 |
| Inspection Shift 1 | 0.419 | 0.115 | 0.253 | 0.069 |
| Inspection Shift 2 | 0.398 | 0.083 | 0.253 | 0.075 |

TABLE 2

Mean and standard deviation values for two-waveband ratio using 580 nm and 620 nm for wholesome and unwholesome chicken images

|  | Wholesome | | Unwholesome | |
| --- | --- | --- | --- | --- |
|  | Mean | SD | Mean | SD |
| Hyperspectral Analysis | 0.948 | 0.037 | 0.904 | 0.052 |
| Inspection Shift 1 | 0.958 | 0.033 | 0.918 | 0.048 |
| Inspection Shift 2 | 0.941 | 0.038 | 0.919 | 0.048 |

Figure 15:
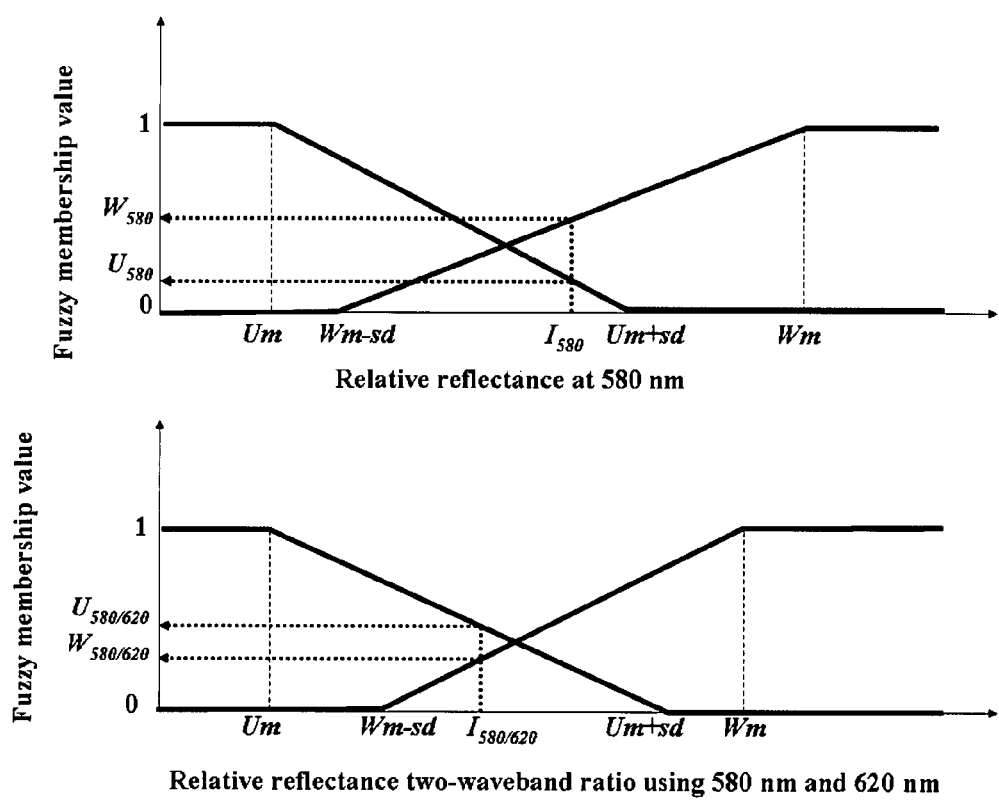
FIG. 15 is a diagram of the structure of the fuzzy logic membership functions which use the intensity-based input value and ratio-based input value to create pixel-based decision outputs for wholesomeness classification.
Figure 16:
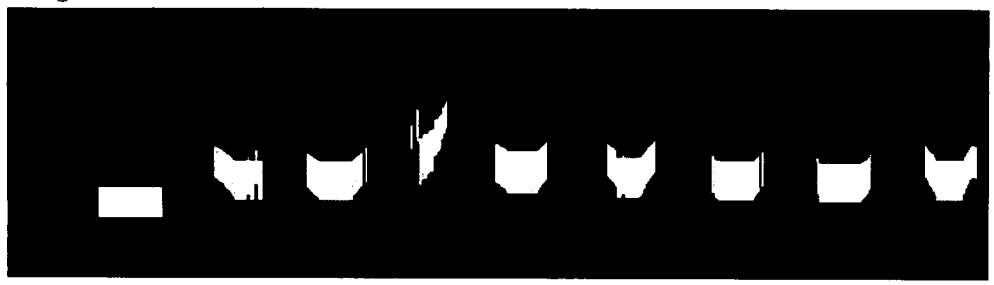
FIG. 16 shows a masked image (top) of nine chickens that highlights the ROI pixels to be analyzed for each chicken, and a second image (bottom) highlighting the ROI pixels for each chicken that were classified as wholesome.
Figure 16:
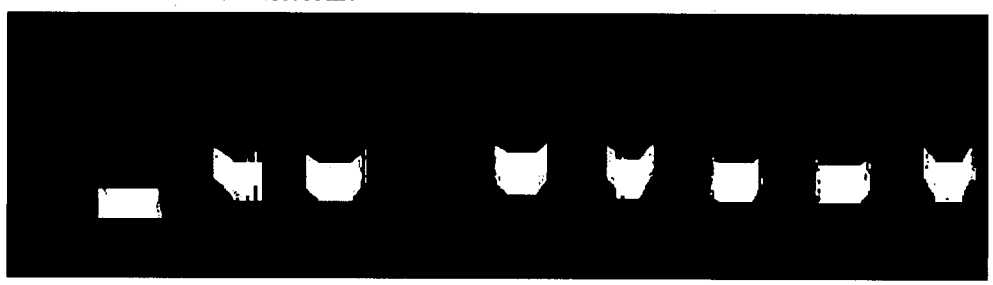

For multispectral classification, fuzzy logic membership functions were built based on the mean and standard deviation values for the 580 nm key waveband from the hyperspectral analysis data subset, and on the mean and standard deviation values for the 580 nm and 620 nm two-waveband ratio, again from the hyperspectral analysis data subset. FIG. 15 shows the structure of the fuzzy logic membership functions. These functions were used to classify each ROI pixel within an image as either wholesome or unwholesome, by using each pixel's 580 nm intensity value at 580 nm and its ratio value as inputs to obtain a decision output value $D_o$ between 0 and 1. The average $D_o$ value for a bird was used to determine a wholesome or unwholesome assignment by comparison with a threshold value. FIG. 16 first shows a masked image of nine chickens with all ROI pixels highlighted for each chicken (top), and then another image highlighting only those ROI pixels that were classified as wholesome pixels (bottom), i.e., $D_o$ values of individual pixels were each compared to the 0.6 threshold value. The fourth chicken from the left is an unwholesome bird and all of its ROI pixels were identified as unwholesome, consequently not appearing in the second image (bottom).

Figure 17:
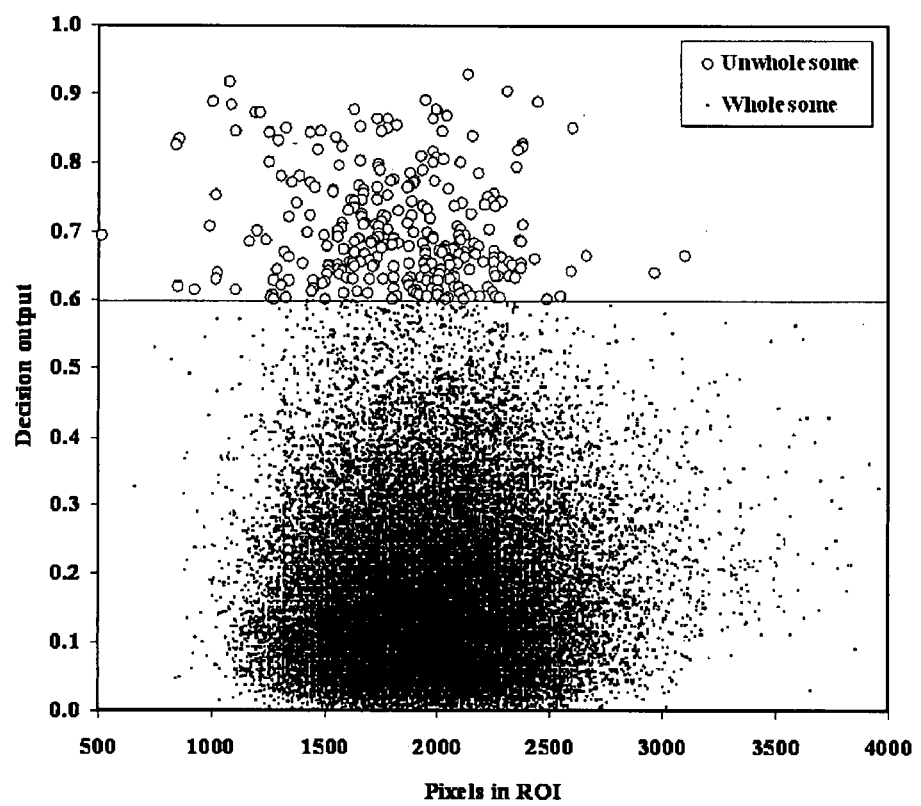
FIG. 17 is a scatterplot graph showing the distribution of chicken carcasses imaged during inspection shift 1, by the number of ROI pixels and the final decision output for each chicken.
Figure 18:
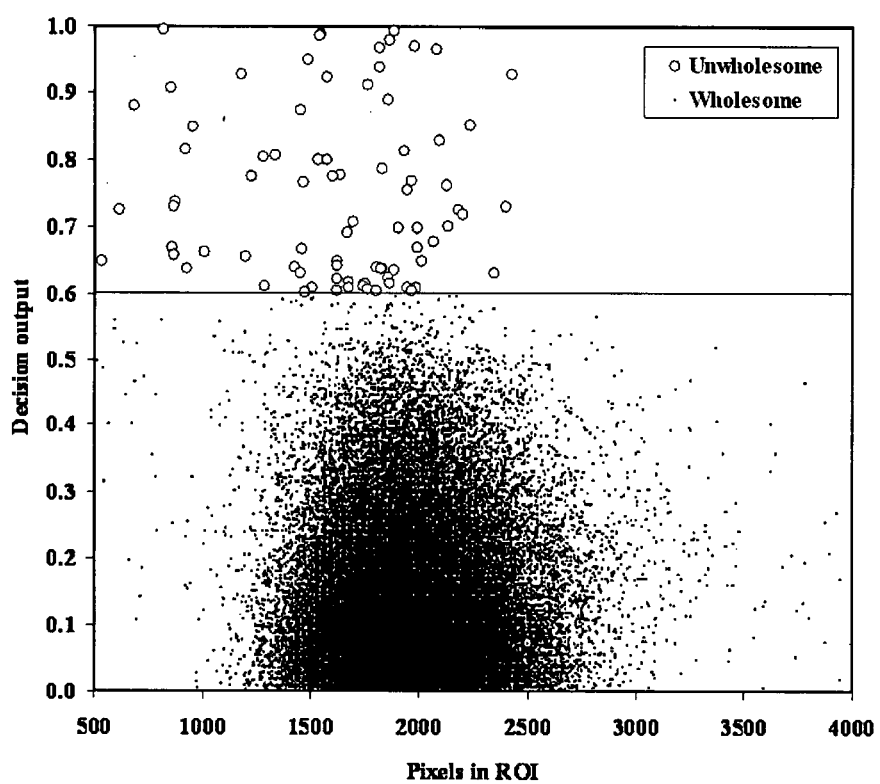
FIG. 18 is a scatterplot graph showing the distribution of chicken carcasses imaged during inspection shift 2, by the number of ROI pixels and the final decision output for each chicken.

FIGS. 17 and 18 show scatterplots of the imaging system's decision outputs against the number of ROI pixels for each chicken imaged during inspection shifts 1 and 2. The total numbers of wholesome and unwholesome chickens identified by the system are shown in Table 3 below, compared with numbers drawn from FSIS tally sheets created by three inspection stations on the same processing line during those two inspection shifts. Although direct bird-to-bird comparison between the imaging inspection system and the inspectors was not possible, surprisingly the percentages indicated that the relative numbers of wholesome and unwholesome identified by the imaging inspection system and by the processing line inspectors were not significantly different.

TABLE 3

Wholesome and unwholesome birds identified during inspection shifts by processing line inspectors and by the imaging inspection system

| | Line inspectors | | | Imaging inspection system | | |
|---|---|---|---|---|---|---|
| | Wholesome | Unwholesome | Total | Wholesome | Unwholesome | Total |
| Shift 1 | 53563 (99.84%) | 84 (0.16%) | 53647 (100%) | 45305 (99.37%) | 288 (0.63%) | 45593 (100%) |
| Shift 2 | 64972 (99.89%) | 71 (0.11%) | 65043 (100%) | 60922 (99.84%) | 98 (0.16%) | 61020 (100%) |

A veterinarian also conducted several periods of system verification, each lasting approximately 30 to 40 minutes. The veterinarian conducted bird-by-bird observation of chicken carcasses immediately before they entered the IFOV of the imaging system. The imaging system output was observed for agreement with the veterinarian's identifications. The veterinarian observed 16,174 wholesome birds and 43 unwholesome birds over 4 verification periods during inspection shift 1. Of these birds, the imaging system surprisingly incorrectly identified only 118 wholesome birds (99.27% correct) and 2 unwholesome birds (95.35% correct). The veterinarian observed 27,626 wholesome birds and 35 unwholesome birds over 6 verification periods during inspection shift 2. Of these birds, the imaging system surprisingly incorrectly identified only 46 wholesome birds (99.83% correct) and 1 unwholesome bird (97.14% correct). These results, together with the percentages listed in Table 3, strongly suggest that the imaging inspection system can perform successfully on a commercial poultry processing line.

For multispectral inspection as conducted on a 140 bpm processing line as was performed for this example, the imaging system acquired about 30 to 40 line-scan images between the SP and EP for each chicken inspected. Previous testing of the imaging system on a 70 bpm processing line demonstrated similar performance in identification of wholesome and unwholesome birds with the analysis of about 70-80 line-scan images for each chicken. Because the unwholesome birds exhibit a systemic unwholesome condition affecting the entire body of the bird, this line-scan imaging system is able to identify such birds at even higher speeds; on a 200 bpm processing line, for example, the system would perform similarly in identifying wholesome and unwholesome birds by analyzing about 20-25 line-scan images for each chicken.

U.S. Pat. No. 6,587,575 is herein incorporated by reference. The following references were authored or co-authored by the inventors and are relevant to the current disclosure: Chao et al, Applied Engineering in Agriculture, 18(1): 78-84 (2002); Chao et al., Proc. SPIE, 6381:63810V1-63810V11 (2006); Chao et al., J. Sensing and Instrumentation for Food Quality and Safety, 1(2): 62-71 (2007); Lawrence et al, Trans. ASAE, 46(2): 513-521 (2003); Park et al, Trans. ASAE, 45(6): 2017-2026 (2003); Park et al., J. Food Processing Engineering, 27(5): 311-327 (2005); Yang et al., J. Food Engineering, 69(2): 225-234 (2005); Yang et al., Proc. SPIE, 6381:63810Y1-63810Y10 (2006); Yang et al., Trans. ASAE, 49(1): 245-257 (2006).

Thus, in view of the above, the present invention concerns (in part) the following:

An imaging system for food safety wholesomeness inspection of freshly slaughtered chicken carcasses on a processing line (for acquisition and processing of hyperspectral/multispectral reflectance images of freshly slaughtered chicken carcasses on a processing line for food safety inspection), comprising (or consisting essentially of or consisting of):
  a means for obtaining both hyperspectral and multispectral images (of freshly slaughtered chicken carcasses on a processing line), and
  a data acquisition/processing unit operatively connected to said means for obtaining hyperspectral and multispectral images
(wherein the system is capable of hyperspectral/multispectral imaging to detect individual chicken carcasses on a processing line and to determine the wholesome or unwholesome condition of a chicken carcass).

The above imaging system wherein said system further comprises a lighting system (operatively connected to said means for obtaining hyperspectral and multispectral images).

The above imaging system wherein said system further comprises a means of creating a dark imaging background.

The above imaging system wherein said means for obtaining hyperspectral and multispectral images comprises (only one of each):
  (an imaging device utilizing) an electron-multiplying charge-coupled device detector,
  a (14-bit and/or 16-bit) digitizer operatively connected to said electron multiplying charge-coupled device detector (wherein said digitizer has a pixel-readout rate in the range of approximately 10 MHz to approximately 30 MHz),
  a line-scan spectrograph operatively connected to said electron-multiplying charge-coupled device detector, and
  a lens assembly operatively connected to said line-scan spectrograph.

The above imaging system wherein said means for obtaining hyperspectral and multispectral images does not include a shutter.

The above imaging system wherein said lighting system comprises continuous wave light sources for reflectance imaging.

The above imaging system wherein said lighting system comprises at least two continuous wave light sources for reflectance imaging to provide illumination spanning at least 400 nm to 800 nm in the visible/near-infrared spectrum with a total intensity of at least 10,000 lux (lumens/m$^2$).

The above imaging system wherein said data acquisition/processing unit is encoded with algorithms for hyperspectral/multispectral image acquisition, analysis, and classification.

A method of determining parameters for multispectral inspection of freshly slaughtered chicken carcasses to identify wholesome and unwholesome chicken carcasses (by analyzing a set of hyperspectral images of wholesome and unwholesome chicken carcasses), comprising (or consisting essentially of or consisting of):
  (a) optimization of the location and size of a Region of Interest within individual bird images for identification of wholesome and unwholesome chicken carcasses by spectral analysis;
  (b) selection of key wavebands based on reflectance intensity at a single waveband and on ratio of reflectance intensities at two wavebands for input into a fuzzy logic classifier to identify wholesome and unwholesome chicken carcasses wavebands;
  (c) construction of fuzzy logic membership functions for identifying wholesome and unwholesome chickens, by use of the following algorithm:
    (i) specify the size and location of potential Region of Interest selections across the breast area of chicken carcass images relative to vertical pixel coordinates within the images, for which said pixel coordinates are defined by percentage values of the distance extending from a horizontal line across the chicken breast area towards the chicken neck area to the furthest non-background pixel;
    (ii) for each potential Region of Interest selection, calculate the average reflectance spectrum calculated using all Region of Interest pixels for all wholesome chickens in the set of hyperspectral images;
    (iii) for each potential Region of Interest selection, calculate the average reflectance spectrum calculated using all Region of Interest pixels for all unwholesome chickens in the set of hyperspectral images;
    (iv) for each potential Region of Interest selection, calculate the difference spectrum between the average wholesome spectrum and average unwholesome spectrum, and note the maximum difference value that occurs for each potential Region of Interest;
    (v) compare the maximum difference values from all potential Regions of Interest to select the Region of Interest that resulted in the greatest maximum difference value as the optimized Region of Interest to use for multispectral identification of wholesome and unwholesome chicken carcasses;
    (vi) select the waveband corresponding to the greatest maximum difference value of the optimized Region of Interest as the key wavelength to use for multispectral identification of wholesome and unwholesome chickens based on reflectance intensity;
    (vii) using the optimized Region of Interest calculate the mean and standard deviation of reflectance intensity at the key wavelength from (vi) for wholesome chickens and calculate the mean and standard deviation of reflectance intensity values at the key wavelength for unwholesome chickens;
    (viii) specify potential pairs of key wavebands selected according to local maxima and minima in the difference spectrum of the optimized Region of Interest;
    (ix) calculate the band ratio value for each potential pair of key wavebands for the average wholesome Region of Interest reflectance spectrum calculated in (ii) and the average unwholesome Region of Interest reflectance spectrum calculated in (iii);
    (x) select the waveband pair corresponding to the greatest difference between band ratio values for wholesome and unwholesome as the key waveband pair to use for multispectral identification of wholesome and unwholesome chicken carcasses based on ratio value;
    (xi) using the optimized Region of Interest calculate the mean and standard deviation of the two-waveband ratio from (x) for wholesome chickens and calculate the mean and standard deviation of the two-waveband ratio for unwholesome chickens; and
    (xii) construct fuzzy logic membership functions based on the mean and standard deviation values for key wavelength (intensity) and two-waveband ratio values for wholesome and unwholesome chickens.

The above method wherein a set of hyperspectral images of freshly slaughtered wholesome and unwholesome chicken carcasses is acquired with the use of an imaging system with at least one electron-multiplying charge-coupled device detector operatively connected to both a spectrograph and a lens assembly.

The above method wherein a set of hyperspectral images of freshly slaughtered wholesome and unwholesome chicken carcasses is acquired with the use of a lighting system providing continuous wave illumination spanning at least 400 nm to 800 nm in the visible/near-infrared region of the electromagnetic spectrum of at least 10,000 lux (lumen/m$^2$) and a means of providing a dark imaging background.

A method of multispectral inspection of freshly slaughtered chicken carcasses to identify wholesome and unwholesome chicken carcasses on a chicken processing line, comprising (or consisting essentially of or consisting of):
  (a) continuous real-time acquisition of line-scan images of freshly slaughtered chickens on a commercial chicken processing line (operated at speeds between about 70 to about 200 birds per minute (e.g., 70-200 bpm);
  (b) real-time analysis of individual line-scan images to identify the presence and entrance of the leading edge of a chicken into the linear field of view of the imaging inspection system;
  (c) real-time analysis of individual line-scan images to locate Region of Interest pixels for individual chickens;
  (d) real-time calculation of decision output values for Region of Interest pixels in individual line-scan images;
  (e) real-time analysis of individual line-scan images to identify the exit of the trailing edge of a chicken from the linear field of view of the imaging inspection system; and
  (f) calculation of average decision output values to identify chickens as being wholesome or unwholesome by comparison to a threshold value, by use of the following algorithm:
    (i) acquire a line-scan image and analyze the line-scan image to determine if the starting point coordinate of a chicken has been assigned, if no starting point coordinate has been assigned then repeat acquisition and analysis until a line-scan image is encountered for which a starting point coordinate has been assigned;
(ii) locate the Region of Interest pixels within the line-scan image and calculate the decision output value for each Region of Interest pixel by using the reflectance intensity and waveband ratio values at the key wavebands as inputs to the fuzzy logic membership functions for classification, acquire a new line-scan image if no ending point coordinate has been assigned, repeat location of the Region of Interest and calculation of decision output values for each Region of Interest pixel for each new line-scan image until a line-scan image is encountered for which an ending point coordinate has been assigned;
(iii) calculate the average decision output value for the chicken across all Region of Interest pixels using values calculated in (ii); and
(iv) compare the average decision output value with the threshold value to identify an individual bird as either wholesome or unwholesome.

The above method wherein real-time analysis of individual line-scan images to identify the presence and entrance of the leading edge of a chicken into the linear field of view of the imaging inspection system is performed by using the following algorithm:
(a) examine the 1-dimensional data array whose indices correspond to the uppermost 256 pixels of the line-scan image with 1 at the top of the line-scan image and which contains the relative reflectance values at the 620 nm waveband of the uppermost 256 pixels, if the array contains only values corresponding to background pixels having relative reflectance below 0.1 then continue examining subsequent line-scan images until the first non-background pixel or group of pixels is detected within the array; when any non-background pixels having relative reflectance greater than 0.1 are detected, indicating that a new chicken has entered the linear field of view, note the corresponding index of the first uppermost such pixel and assign this index as the top reference coordinate, if the value of the array at the last index does not correspond to a background pixel then note the index of the last lowermost background pixel in the array and assign this index as the bottom reference coordinate;
(b) for the subsequent line-scan image, examine only the array values at the indices corresponding to and including the top reference coordinate and the bottom reference coordinate, within these indices find the index of the first uppermost background pixel and the last lowermost background pixel and reassign these indices to be the top reference coordinate and bottom reference coordinate respectively;
(c) for each subsequent line-scan image continue searching for first and last background pixels between the top reference coordinate and bottom reference coordinate and then re-assigning the reference coordinates to the corresponding indices; and
(d) when a line-scan image is found for which there are no background pixels occurring between the top reference coordinate and the bottom reference coordinate, check whether the top and bottom reference coordinates are assigned to the same index value, if they are the same then assign the vertical coordinate of the corresponding image pixel to be the starting point pixel, if they are not the same then assign the median of the two indices to be the starting point for the current chicken being imaged.

The above method wherein real-time analysis of individual line-scan images to locate Region of Interest pixels for individual chickens is performed by using the following algorithm:
(a) if the starting point has been assigned for the current chicken being imaged, examine the line-scan image and find the lowermost non-background pixel within the line-scan image which may coincide with the lowermost pixel of the line-scan image if there are no background pixels that the bottom of the line-scan image;
(b) find the number of pixels between and including the starting point coordinate and the lowermost non-background pixel and consider this the reference distance; and
(c) with the previously determined values of parameters m and n, each in the range between 0% and 100%, select all pixels within the line-scan image that occur between m % of the reference distance and n % of the reference distance, where the starting point coordinate is at 0% and the lowermost non-background pixel is the at 100%, these selected pixels comprise the ROI for this line-scan image.

The above method wherein real-time analysis of individual line-scan images to identify the exit of the trailing edge of a chicken from the linear field of view of the imaging inspection system is performed by using the following algorithm:
(a) if the starting point has been assigned for the current chicken being imaged, examine the relative reflectance value at 620 nm of the line-scan image at the starting point coordinate;
(b) if the value corresponds to a non-background pixel, relative reflectance greater than 1.0, do not assign a value to be the ending point coordinate; and
(c) if the value corresponds to a background pixel, relative reflectance less than 0.1, then assign the starting point coordinate to be the ending point coordinate, indicating that the previous line-scan image was the last line-scan to be analyzed for the current chicken being imaged and no additional line-scans are to be analyzed.

The above method wherein real-time calculation of decision output values for each Region of Interest pixel in the line-scan images is performed using a fuzzy logic classifier defined by the following equation:

$$D_o = \max[\min\{w_1, w_2\}, \min\{u_1, u_2\}]$$

wherein $w_1$ and $u_1$ are fuzzy membership values for the pixel based on the reflectance intensity at the key wavelength, $w_2$ and $u_2$ are fuzzy membership values based on the two-waveband ratio, min indicates a minima operation that selects the smaller of the two values, max indicates a maxima operation that selects the larger of the two values, and $D_o$ is the decision output value for the pixel.

A process for automated online inspection of freshly slaughtered chicken carcasses on a processing line to identify wholesome and unwholesome chickens, comprising (or consisting essentially of or consisting of):
(a) illuminating said chicken carcasses with a source of electromagnetic radiation having a predetermined spectral content,
(b) detecting radiation from said source reflected by said chicken carcasses in each of two key wavelengths, $\lambda_1$ and $\lambda_2$, using an imaging system that correlates radiation intensity at each of the two key wavelengths with spatial pixels of the images of said chicken carcasses,
(c) identifying the entrance and exit of each of said chicken carcasses through the field of view of the imaging system, (d) identifying selected areas of each image of said chicken carcasses for which the values of reflected radiation intensity will be used in calculations to identify wholesomeness or unwholesomeness, (e) calculating the ratio of the radiation intensity at $\lambda_1$ divided by the radiation intensity at $\lambda_2$ for each pixel in the selected areas of each image, (f) calculating decision output values for each image pixel using a fuzzy logic classifier, and (g) generating an identification of being wholesome or unwholesome for each of said chicken carcasses based on the comparison of the average decision output for the selected area of each chicken image with a decision-making threshold value.

The above process wherein $\lambda_1$ is from about 570 nm to about 590 nm (e.g., 570-590 nm) and 2 is from about 610 nm to about 630 nm (e.g., 610-630 nm).

The above process wherein $\lambda_1$ is about 580 nm and $\lambda_2$ is about 620 nm.

The above process wherein $\lambda_1$ is 580 nm and $\lambda_2$ is 620 nm.

A process for automated online inspection of freshly slaughtered chicken carcasses on a processing line to identify wholesome and unwholesome chickens, comprising (or consisting essentially of or consisting of) following the procedure in FIG. 4.

A method of determining parameters for multispectral inspection of freshly slaughtered chicken carcasses to identify wholesome and unwholesome chicken carcasses (by analyzing a set of hyperspectral images of wholesome and unwholesome chicken carcasses), comprising (or consisting essentially of or consisting of) following the procedure in FIG. 3.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method of distinguishing wholesome animal carcasses from unwholesome animal carcasses, the method comprising the steps of:
   (a) selecting a Region of Interest (ROI) on an animal carcass, wherein the ROI is selected by comparing the maximum spectral difference values from potential ROIs to select an optimized ROI that results in the greatest maximum spectral difference value as the ROI;
   (b) acquiring an image of the animal carcass, the image comprising a series of pixels in the ROI;
   (c) using data associated with the ROI pixels to calculate a decision output parameter; and
   (d) using the decision output parameter to distinguish wholesome animal carcasses and unwholesome animal carcasses.

2. The method of claim 1 wherein in step (b), the image comprises a line scan image.

3. The method of claim 2 wherein steps (b)-(c) are repeated continuously until decision output parameters have been calculated for all ROI pixels associated with the animal carcass.

4. The method of claim 3 wherein all the decision output parameters are processed so that an average decision output parameter for the animal carcass is calculated.

5. The method of claim 4 wherein the average decision output parameter is compared to a threshold value to determine whether the animal carcass is wholesome or unwholesome.

6. A method for inspecting animal carcasses, the method comprising the steps of:
   (a) acquiring a line scan image of an animal carcass, the line scan image comprising a series of pixels;
   (b) identifying and processing data associated with each of the pixels;
   (c) selecting Region of Interest (ROI) pixels in each line scan image so that selected processed pixel data comprises ROI pixel data, ROI pixels comprising only animal pixels that occur between an upper boundary m % and a lower boundary n % of a reference distance, where both m % and n % is are less than 100% of the reference distance, and the reference distance is the count of the ROI pixels comprising only animal pixels;
   (d) using the ROI pixel data to calculate a decision output parameter; and
   (e) using the decision output parameter to distinguish wholesome animal carcasses and unwholesome animal carcasses.

7. The method of claim 6 wherein steps (a)-(d) are repeated continuously until decision parameters have been calculated for all ROI pixels associated with the animal carcass.

8. The method of claim 7 wherein an average decision output parameter for the animal carcass is calculated.

9. The method of claim 8 wherein the average decision output parameter is compared to a threshold value to determine whether the animal carcass is wholesome or unwholesome.

10. The method of claim 6 wherein in step (c), the reference distance for each line scan comprises a pixel length between a line on a designated area of the animal carcass and a furthest animal pixel from the line.

11. The method of claim 6 wherein m is 40% and n is 60%.

12. The method of claim 6 wherein in step (c), less than 4 key wavebands are selected and a waveband ratio value is calculated for each ROI pixel, the ROI pixel data comprising the waveband ratio value.

13. The method of claim 12 wherein only one waveband ratio value is used to calculate the decision output parameter.

14. The method of claim 6 wherein in step (c) a relative intensity waveband is selected and used to determine relative intensity values for each ROI pixel, the ROI pixel data further comprising the relative intensity values.

15. The method of claim 6 wherein the ROI in step (c) comprises an essentially contiguous region on the animal carcass, the ROI comprising less than half of the animal carcass.

16. The method of claim 6 wherein the ROI in step (c) does not include limbs, appendages, or other extremities associated with the animal carcass.

17. The method of claim 6 wherein, before step (a), acquiring an imaging system, wherein the series of pixels acquired in step (a) comprises a data array.

18. The method of claim 17, wherein the imaging system identifies a presence and entrance of a leading edge of the animal carcass into a linear field of view of the imaging system by:
   (a) examining the line scan data array whose indices correspond to an uppermost group of pixels of the line-scan image;
   (b) if the array contains only values corresponding to non-animal pixels then the imaging system continues examining subsequent line-scan images until a first animal pixel is detected within the array;
   (c) when an animal pixel is detected indicating that a new animal carcass has entered the linear field of view, the imaging system notes an index value corresponding to a first uppermost non-animal pixel and assigns this index value as a top reference coordinate;
(d) if a value of a line scan data array at a last index value does not correspond to a non-animal pixel, then the imaging system notes an index value for a lowermost non-animal pixel and assigns this index as the bottom reference coordinate;
(e) for subsequent line-scan images, the imaging system examines only array values at the indices corresponding to the top reference coordinate and the bottom reference coordinate and array values between the top reference coordinate and the bottom reference coordinate; within these indices find an index value of an uppermost non-animal pixel and the lowermost non-animal pixel and reassign these indices to be the top reference coordinate and bottom reference coordinate respectively;
(f) for each subsequent line-scan image, the imaging system continues searching for first and last non-animal pixels between the top reference coordinate and the bottom reference coordinate and then re-assigning the reference coordinates to the corresponding indices; and
(g) when a line-scan image is found for which there are no non-animal pixels occurring between the top reference coordinate and the bottom reference coordinate, the imaging system checks whether the top and the bottom reference coordinates are assigned to a same index value, if they are the same, then assign a coordinate of the corresponding pixel to be a Starting Point, if they are not the same, then assign the median of the two indices to be the Starting Point for the current animal carcass being imaged.

19. The method of claim 18 wherein an exit of a trailing edge of an animal carcass is identified by:
(a) examining a pixel at the Starting Point coordinate at a beginning of each line scan;
(b) if the pixel at the Starting Point coordinate is an animal pixel, continue scanning until the pixel at the Starting Point coordinate is a non-animal pixel.
(c) if the pixel at the Starting Point coordinate is a non-animal pixel, assign the pixel to be an Ending Point coordinate, indicating that the previous line-scan image was the last line-scan image to be analyzed and that no additional line scans are to be analyzed for ROI pixels for the current animal carcass.

* * * * *